United States Patent
Hegge

(10) Patent No.: US 9,144,057 B2
(45) Date of Patent: Sep. 22, 2015

(54) DATA DISTRIBUTION CONTROL DEVICE, DATA DISTRIBUTION SYSTEM, AND METHOD OF CONTROLLING DATA DISTRIBUTION

(71) Applicant: FUJITSU LIMITED, Kawasaki-shi, Kanagawa (JP)

(72) Inventor: Stephan Hegge, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 14/027,470

(22) Filed: Sep. 16, 2013

(65) Prior Publication Data

US 2014/0022977 A1 Jan. 23, 2014

Related U.S. Application Data

(63) Continuation of application No. PCT/JP2011/056443, filed on Mar. 17, 2011.

(51) Int. Cl.
| | |
|---|---|
| *H04W 72/00* | (2009.01) |
| *H04L 29/06* | (2006.01) |
| *H04W 52/02* | (2009.01) |
| *H04W 48/20* | (2009.01) |
| *H04W 72/04* | (2009.01) |
| *H04W 84/04* | (2009.01) |

(52) U.S. Cl.
CPC ......... *H04W 72/005* (2013.01); *H04L 65/4076* (2013.01); *H04W 52/0206* (2013.01); *H04W 48/20* (2013.01); *H04W 72/0473* (2013.01); *H04W 84/045* (2013.01)

(58) Field of Classification Search
None
See application file for complete search history.

(56) References Cited

U.S. PATENT DOCUMENTS

| | | | | |
|---|---|---|---|---|
| 5,379,451 | A | * | 1/1995 | Nakagoshi et al. ......... 455/435.1 |
| 6,434,396 | B1 | * | 8/2002 | Rune .............................. 455/502 |
| 6,483,818 | B1 | * | 11/2002 | Ohno et al. .................... 370/328 |
| 8,761,192 | B2 | * | 6/2014 | Vrzic et al. .................... 370/436 |
| 2002/0012327 | A1 | * | 1/2002 | Okada .......................... 370/328 |
| 2003/0039225 | A1 | * | 2/2003 | Casati et al. .................. 370/328 |

(Continued)

FOREIGN PATENT DOCUMENTS

| | | |
|---|---|---|
| JP | 2007-532074 | 11/2007 |
| JP | 2009-182944 | 8/2009 |

(Continued)

OTHER PUBLICATIONS

International Search Report issued for corresponding International Application No. PCT/JP2011/056443, mailed Jun. 14, 2011, with English translation.

*Primary Examiner* — Hong Cho
(74) *Attorney, Agent, or Firm* — Myers Wolin, LLC

(57) ABSTRACT

A data distribution control apparatus controls data distribution in which distribution data having the same content are distributed to multiple wireless terminals. The data distribution control apparatus is provided with a terminal identifying unit which identifies the multiple wireless terminals to which the distribution data are distributed and a base station designating unit which designates a set of base stations selected so that one or more base stations can be connected to all of the multiple wireless terminals as the set of base stations which transmit the distribution data to the wireless terminals. The base station designating unit includes, in the set, a base station which can be connected to the multiple wireless terminals, prior to a base station which can be connected to only one wireless terminal.

16 Claims, 22 Drawing Sheets

(56) References Cited

U.S. PATENT DOCUMENTS

| | | | |
|---|---|---|---|
| 2004/0266474 A1* | 12/2004 | Petrus | 455/525 |
| 2005/0245260 A1 | 11/2005 | Nielsen et al. | |
| 2008/0151828 A1* | 6/2008 | Bjorken et al. | 370/329 |
| 2008/0311926 A1 | 12/2008 | Fischer et al. | |
| 2009/0059835 A1* | 3/2009 | Motegi et al. | 370/312 |
| 2009/0175183 A1* | 7/2009 | Mochizuki et al. | 370/252 |
| 2010/0105366 A1 | 4/2010 | Zhao et al. | |
| 2010/0189027 A1 | 7/2010 | Ishida et al. | |
| 2010/0284333 A1* | 11/2010 | Shirota et al. | 370/328 |
| 2011/0243077 A1* | 10/2011 | Tazaki | 370/329 |
| 2011/0275361 A1* | 11/2011 | Yavuz et al. | 455/422.1 |

FOREIGN PATENT DOCUMENTS

| | | |
|---|---|---|
| JP | 2009-188612 | 8/2009 |
| JP | 2010-521843 | 6/2010 |
| JP | 2010-157918 | 7/2010 |
| JP | 2010-529731 | 8/2010 |
| WO | 2008/155915 | 12/2008 |

\* cited by examiner

FIG. 4

| TERMINAL IDENTIFIER | DISTRIBUTION DATA IDENTIFIER |
|---|---|
| TERMINAL A | PROGRAM X |
| TERMINAL B | PROGRAM Y |
| TERMINAL C | PROGRAM X |
| ⋮ | ⋮ |

FIG. 5

```
REPORT BASE STATION:BASE STATION C

MEASUREMENT TERMINAL:TERMINAL A
  RECEIVING STRENGTH FROM BASE STATION A:-60dBm
  RECEIVING STRENGTH FROM BASE STATION B:-100dBm
  RECEIVING STRENGTH FROM BASE STATION C:-20dBm

MEASUREMENT TERMINAL:TERMINAL C
  RECEIVING STRENGTH FROM BASE STATION C:-30dBm
  RECEIVING STRENGTH FROM BASE STATION E:-50dBm
                        ⋮
```

| BASE STATION | TERMINAL LIST | ORDER |
|---|---|---|
| BASE STATION A | TERMINAL B  TERMINAL E<br>TERMINAL F  TERMINAL G | 1 |
| BASE STATION D | TERMINAL A  TERMINAL C  TERMINAL D | 2 |
| BASE STATION B | TERMINAL B  TERMINAL I | 3 |
| BASE STATION E | TERMINAL H  TERMINAL J | 4 |
| BASE STATION C | TERMINAL I  TERMINAL A | 5 |
| BASE STATION F | TERMINAL B | 6 |

FIG. 13

| BASE STATION IDENTIFIER | COORDINATE INFORMATION |
|---|---|
| BASE STATION A | 35° 628912' NORTH LATITUDE; 139° 723175' EAST LONGITUDE |
| BASE STATION B | 35° 629000' NORTH LATITUDE; 139° 723180' EAST LONGITUDE |
| BASE STATION C | 35° 629010' NORTH LATITUDE; 139° 723200' EAST LONGITUDE |
| BASE STATION D | 35° 628980' NORTH LATITUDE; 139° 723190' EAST LONGITUDE |
| ⋮ | ⋮ |

FIG. 14

| BASE STATION IDENTIFIER | FREQUENCY |
|---|---|
| BASE STATION A<br>BASE STATION B<br>BASE STATION C<br>BASE STATION D | 1921Mhz、1922Mhz |
| ⋮ | ⋮ |

FIG. 20

| MACRO BASE STATION IDENTIFIER | DISTRIBUTION DATA IDENTIFIER |
|---|---|
| MACRO BASE STATION A | NEWS PROGRAM X |
| MACRO BASE STATION B | DRAMA PROGRAM Y |
| ⋮ | ⋮ |

FIG. 21

| TERMINAL IDENTIFIER | MACRO BASE STATION IDENTIFIER |
|---|---|
| TERMINAL A | MACRO BASE STATION A |
| TERMINAL B | MACRO BASE STATION A, MACRO BASE STATION B |
| TERMINAL C | MACRO BASE STATION B |
| TERMINAL D | MACRO BASE STATION B |
| ⋮ | ⋮ |

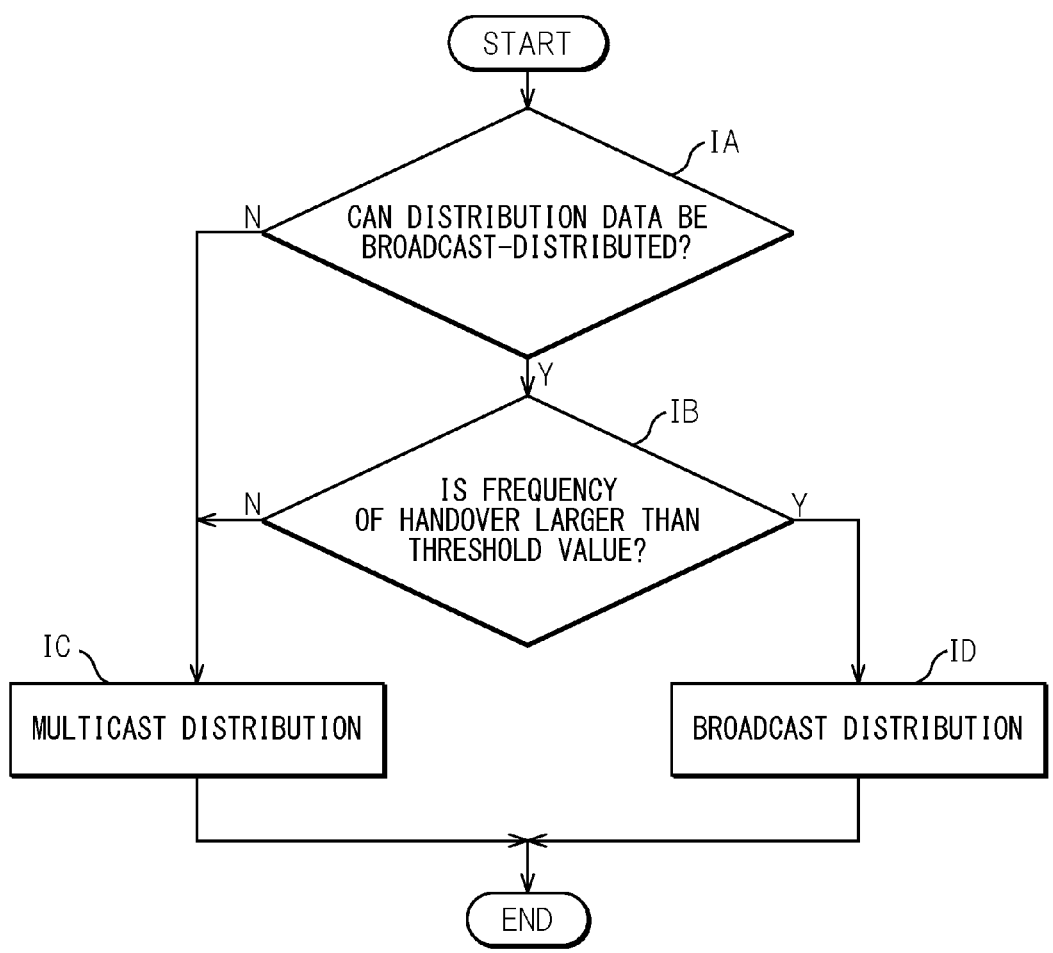

DATA DISTRIBUTION CONTROL DEVICE, DATA DISTRIBUTION SYSTEM, AND METHOD OF CONTROLLING DATA DISTRIBUTION

CROSS-REFERENCE TO RELATED APPLICATION

This application is a continuation application based on International Application No. PCT/JP2011/056443, filed on Mar. 17, 2011, the contents being incorporated herein by reference.

FIELD

The embodiments discussed in the Description relate to the art of data distribution for distributing distribution data having the same content to multiple wireless terminals.

BACKGROUND

Conventionally, in order to improve the communication area of wireless terminals indoors and reduce the load of macrocells, a small-sized base station called a "femtocell base station" has been introduced. Further, as a service for distributing distribution data having the same content to multiple wireless terminals, the MBMS (multimedia broadcasting services) is known. In the MBMS, a data distribution scheme called a MBSFSN (MBMS single frequency network) can be utilized, in which adjacent multiple base stations distribute data using the same frequency. According to this scheme, a frequency resource is shared among multiple base stations, therefore the efficiency of utilization of the frequency resource is improved.

RELATED ART LIST

[Patent Document 1]: Japanese Laid-Open Patent Publication No. 2009-182944
[Patent Document 2]: Japanese Laid-Open Patent Publication No. 2009-188612
[Patent Document 3]: Japanese Laid-Open Patent Publication No. 2010-157918
[Patent Document 4]: Japanese Laid-Open Patent Publication No. 2010-529731

When the above distribution service is provided in a femtocell, there is for example the following issue. In for example the 3GPP (3 Generation Partnership Project) standard, the requirement of synchronization among femtocell base stations is eased compared with the requirement among macrocell base stations.

When the synchronization precision among base stations is low, it becomes difficult to utilize the MBSFSN scheme. This is because radio waves from multiple femtocell base stations reach wireless terminals located at the cell edges, and therefore the quality of reception on the wireless terminals is deteriorated since the radio waves might be dealt as interference when the synchronization precision among the base stations is low. In this case, the situation arises where adjacent base stations transmit distribution data having the same content by using different frequencies, and therefore the efficiency of utilization of the wireless resources decreases.

SUMMARY

According to one aspect of an apparatus, there is given a data distribution control apparatus which controls data distribution to distribute distribution data having the same content to multiple wireless terminals. The data distribution control apparatus is provided with a terminal identifying unit which identifies the multiple wireless terminals to which the distribution data are distributed and with a base station designating unit which designates a set of base stations, which are selected so that one or more base stations can be connected to all of the multiple wireless terminals, as a set of base stations which transmit the distribution data to the wireless terminals. The base station designating unit includes in the set of the base stations a base station which can be connected to multiple wireless terminals prior to a base station which can be connected to only one wireless terminal.

According to another aspect of an apparatus, there is given a data distribution system which is provided with multiple base stations, a data supply apparatus which supplies distribution data to be transmitted from the base stations to wireless terminals, a terminal control apparatus which controls the wireless terminals, and a data distribution control apparatus. The data distribution control apparatus is provided with a terminal information input unit to which a terminal control apparatus inputs terminal information designating the multiple wireless terminals to which the distribution data are distributed, a base station designating unit which designates a set of base stations which are selected so that one or more base stations can be connected to all of the multiple wireless terminals, as a set of base stations which transmit the distribution data to the wireless terminals, and a data transfer unit which transfers the distribution data to the base stations included in the set of base stations. The base station designating unit includes in the set of the base stations a base station which can be connected to multiple wireless terminals prior to a base station which can be connected to only one wireless terminal.

According to an aspect of a method, there is given a control method of data distribution by which the distribution data having the same content are distributed to the multiple wireless terminals. In this method, the multiple wireless terminals to which the distribution data are distributed are identified, the set of base stations is selected so that one or more base stations can be connected to all of the multiple wireless terminals, and the selected set of base stations is designated as the set of base stations which transmit the distribution data to the wireless terminals. When selecting the above-described set of the base stations, a base station which can be connected to multiple wireless terminals is included in the set prior to a base station which can be connected to only one wireless terminal.

The object and advantages of the present invention are embodied and achieved by using elements shown in the claims and the combination of the same. It must be understood that both of the aforesaid general description and following detailed description are only exemplifications and explanations and do not limit the present invention as in the claims.

BRIEF DESCRIPTION OF DRAWINGS

FIG. 4 is a view which depicts an example of a distribution data list.
FIG. 5 is a view which depicts an example of a measurement report.

FIG. 8 is a view which depicts an example of a group GB of base stations.

FIG. 13 is a view which depicts an example of a frequency information request signal.

FIG. 14 is a view which depicts an example of frequency information.

FIG. 20 is a view which depicts an example of data designation information.

FIG. 21 is a view which depicts an example of a macrocell base station which can be connected to terminals.

FIG. 25 is an explanatory diagram of processing for selection of a distribution mode.

DESCRIPTION OF EMBODIMENTS

According to the disclosed apparatus or method, it becomes possible to improve the efficiency of utilization of wireless resources in the case where distribution data having the same content are distributed to multiple wireless terminals.

Figure 1:
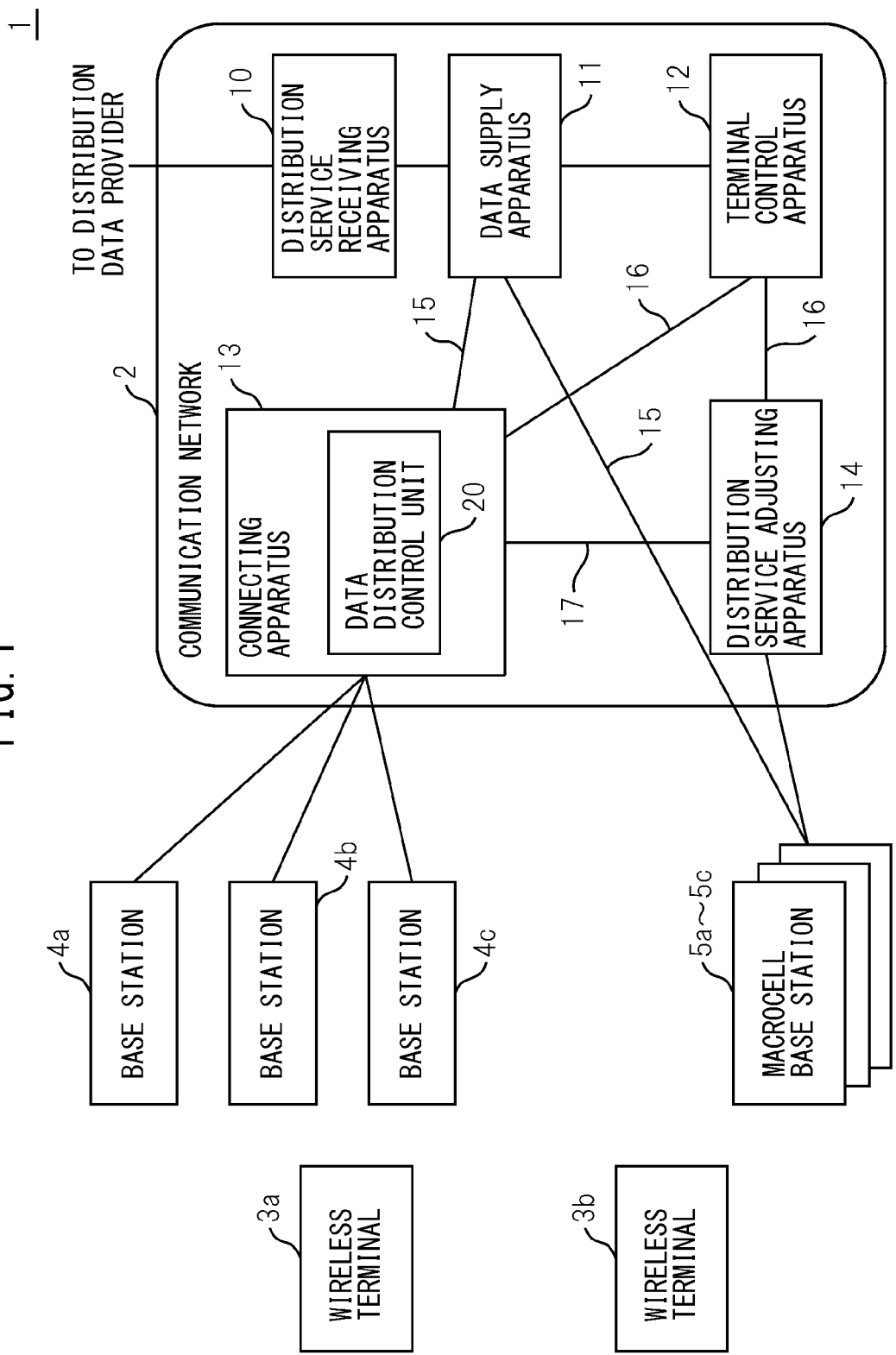
FIG. 1 is a view which represents an example of the configuration of a data distribution system.

Below, preferred embodiments will be explained with reference to the attached drawings. FIG. 1 is a view which represents an example of the configuration of a data distribution system. A data distribution system 1 provides a service of distributing distribution data having the same content to wireless terminals 3a to 3b. The data distribution system 1 is provided with a distribution service receiving apparatus 10, data supply apparatus 11, terminal control apparatus 12, connecting apparatus 13, and distribution service adjusting apparatus 14.

The distribution service receiving apparatus 10, data supply apparatus 11, terminal control apparatus 12, connecting apparatus 13, and distribution service adjusting apparatus 14 are nodes of a communication network 2. Further, the data distribution system 1 is provided with base stations 4a to 4c and macrocell base stations 5a to 5c for connecting the wireless terminals 3a to 3b to the communication network 2.

Note that, in the following explanation and drawings, the wireless terminals 3a to 3b will be sometimes described overall as the "wireless terminals 3". Further, the base stations 4a to 4c will be sometimes described overall as the "base stations 4". Further, the macrocell base stations 5a to 5c will be sometimes described overall as the "macrocell base stations 5". Further, the wireless terminals, base stations, and macrocell base stations will be sometimes abbreviated and described as the "terminals", "base stations", and "macrocell base stations".

The distribution service receiving apparatus 10 is a network node which receives distribution data which is supplied from outside of the communication network 2 by a distribution data provider. The distribution service receiving apparatus 10 generates parameters concerning the provision of service, dispatch, announcement, authentication, and storage. The data supply apparatus 11 is a network node which distributes the distribution data which was received by the distribution service receiving apparatus 10 to the connecting apparatus 13 and macrocell base stations 5.

The terminal control apparatus 12 is a network node which controls the terminals 3. For example, the terminal control apparatus 12 provides to the connecting apparatus 13 a distribution data list which shows the terminals 3 for distribution of the data from the data distribution system 1 and the distribution data to be distributed to the terminals 3. The distribution data list will be explained later.

The distribution service adjusting apparatus 14 is a network node which controls operations of the base stations 4 and macrocell base stations 5, concerning data distribution services which are provided by the data distribution system 1. For example, the distribution service adjusting apparatus 14 controls the frequency used by the macrocell base stations 5, when the data distribution system 1 distributes the distribution data to be provided to the terminals 3.

The connecting apparatus 13 is a network node which connects the base stations 4 to the communication network 2. The connecting apparatus 13 transmits to the base stations 4 downlink data which flows from the communication network 2 to the terminals 3 and receives from the base stations 4 uplink data which flows from the terminals 3 to the communication network 2. Further, the connecting apparatus 13 sets communication parameters of wireless communication between the terminals 3 and the base stations 4. An example of communication parameters will be explained later. Further, the connecting apparatus 13 controls the transmission power strengths of the base stations 4.

The data supply apparatus 11 is connected with the macrocell base stations 5 and connecting apparatus 13 by a logical communication interface 15. Further, the terminal control apparatus 12 is connected with the connecting apparatus 13 and distribution service adjusting apparatus 14 by a logical communication interface 16. Further, the connecting apparatus 13 and the distribution service adjusting apparatus 14 are connected by a logical communication interface 17.

In one embodiment, the data distribution system 1 may be a system which provides an MBMS in a wireless network according to the LTE (long-term evolution) with specs determined by 3GPP. In this case, for example, the communication network 2 is a core network, the distribution service receiving apparatus 10 is a BM-SC (broadcast multicast-service center), the data supply apparatus 11 is an MBMSGW (MBMS gateway), and the distribution service adjusting apparatus 14 may be an MCE (MBMS coordination entity).

Further, the base station 4 may be a femtocell base station called an HeNB (Home eNB), the terminal control apparatus 12 may be an MME (mobility management entity), and the connecting apparatus 13 may be an HeNB GW (home eNB gateway). Further, the communication interfaces 15, 16, and 17 may be M1, M2, and M3 interfaces, respectively. The wireless network used in the data distribution system 1 and the data distribution system 1 may be ones according to other standards as well.

The connecting apparatus 13 is provided with a data distribution control unit 20. The data distribution control unit 20 determines the base stations 4 which transmit the distribution data in the data distribution system 1. Note that, the data distribution control unit 20 does not always have to be an element which is realized as a portion of the connecting apparatus 13. The data distribution control unit 20 may be an independent network node on the communication network 2 and may be realized as the element of a portion of the data supply apparatus 11, terminal control apparatus 12, and distribution service adjusting apparatus 14.

Below, the configuration and operation of the data distribution control unit 20 will be explained. Note that, in the following explanation, an embodiment in a case where the data distribution control unit 20 is a portion of the connecting apparatus 13 will be explained.

Figure 2:
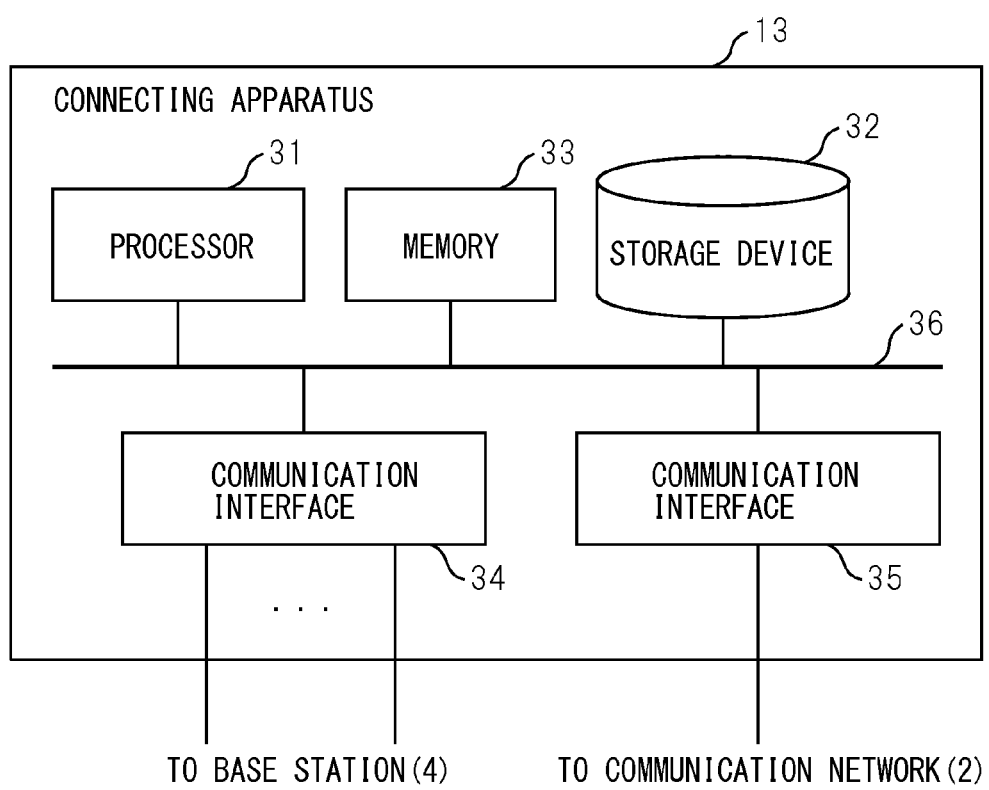
FIG. 2 is a view which represents an example of the hardware configuration of a connecting apparatus.

FIG. 2 is a view which represents an example of the hardware configuration of the connecting apparatus 13. The hardware configuration shown in FIG. 2 is just one of the hardware configurations for realizing the connecting apparatus 13. So along as the processing disclosed below in the Description is performed, any other hardware configuration may be employed as well.

The connecting apparatus 13 is provided with a processor 31, storage unit 32, memory 33, communication interfaces 34 and 35, and data bus 36. The processor 31 runs a program stored in the storage unit 32 to thereby perform the processings for controlling the operation of the connecting apparatus 13 and the following processing for realizing the function achieved by the connecting apparatus 13 for the data distribution service of the data distribution system 1. In the storage unit 32, a program for making the processor 31 performs the above processing is stored. The storage unit 32 may be a hard disk, nonvolatile memory, and so on as the storing means.

The memory 33 stores the program run by the processor 31 and the data temporarily used by this program. The memory 33 may be a read only memory (ROM) and a random access memory (RAM). The communication interface 34 performs transmission/reception processing of signals with the base stations 4. Further, the communication interface 35 performs communication processing via the communication network 2. The above components 31 to 35 are electrically connected by the data bus 36.

Figure 3:
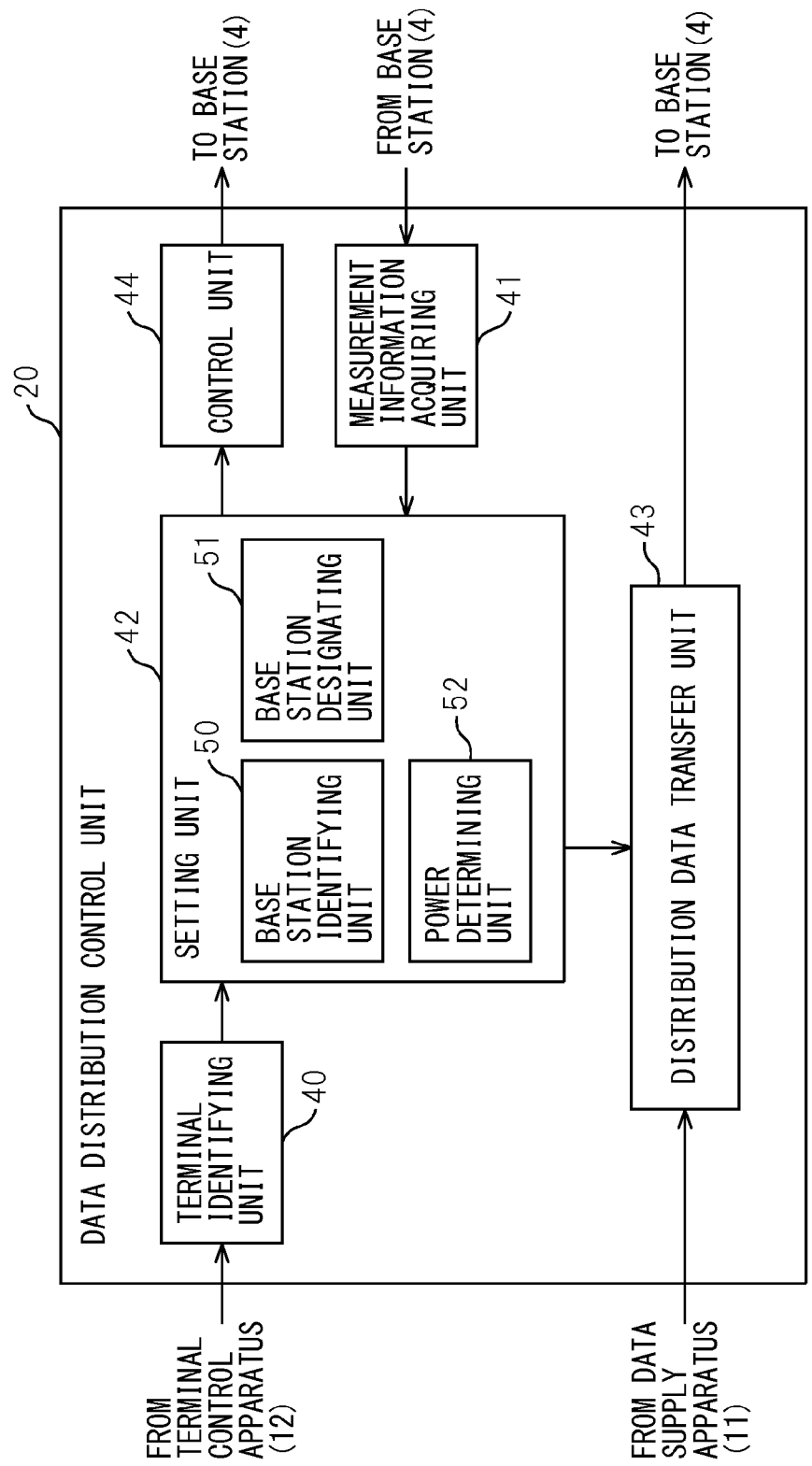
FIG. 3 is a view which represents a first example of the configuration of a data distribution control unit.

FIG. 3 is a view which represents a first example of the configuration of the data distribution control unit 20. The processor 31 in FIG. 2 performs information processing by the components of the data distribution control unit 20 represented in FIG. 3 by coordinating with other hardware elements of the connecting apparatus 13, if necessary, according to a program stored in the storage unit 32. Note that, FIG. 3 primarily shows the functions related to the following explanation. Accordingly, the data distribution control unit 20 and the connecting apparatus 13 may include components other than the shown components. This is true for the other embodiments as well.

The data distribution control unit 20 is provided with a terminal identifying unit 40, measurement information acquiring unit 41, setting unit 42, distribution data transfer unit 43, and control unit 44.

The terminal identifying unit 40 acquires the distribution data list from the terminal control apparatus 12. For example, the terminal identifying unit 40 transmits a distribution data list request signal for requesting the distribution data list to the terminal control apparatus 12. The terminal identifying unit 40 receives the distribution data list transmitted from the terminal control apparatus 12 in response to the distribution data list request signal.

The distribution data list is a list of the terminals 3 to which the data are distributed from the data distribution system 1 and of the distribution data which are distributed to the terminals 3. In the following explanation, the terminal to which the data is distributed from the distribution service of the data distribution system 1 will be described as the "terminal for distribution". An example of the distribution data list is shown in FIG. 4. The distribution data list may have, as the information elements, a "terminal identifier" and "distribution data identifier". The information element "terminal identifier" is an identifier of the terminal for distribution. The information element "distribution data identifier" is an identifier of the distribution data to be distributed to the terminal for distribution.

For example, the distribution data list which is depicted in FIG. 4 shows that audiovisual data of "Program X", "Program Y", and "Program X" are distributed to the "Terminal A", "Terminal B", and "Terminal C", respectively. The terminal identifying unit 40 identifies the terminal for distribution according to the distribution data list. The distribution data list is an example of the terminal information for designating the terminal to which the distribution data is distributed.

FIG. 3 will be referred to. The measurement information acquiring unit 41 acquires the measurement information. The measurement information may include measurement information concerning the base stations 4 and measurement information concerning the terminals 3. The measurement information concerning the base stations 4 may include channel quality information concerning speeds and qualities of channels between the base stations 4 and the connecting apparatus 13.

The measurement information concerning the base stations 4 may include information concerning the terminals 3 which are connected to the base stations 4 and information concerning receiving power strengths from the terminals 3 which were measured at the base stations 4. The measurement information acquiring unit 41 may acquire these information by receiving a measurement report from the base station 4.

The measurement information concerning the terminals 3 may include information concerning the receiving power strengths from the base stations 4 measured at the terminals 3 and a list of base stations 4 and macrocell base stations 5 to which the terminals 3 can be connected. The measurement information acquiring unit 41 may acquire the measurement information concerning the terminals 3 by acquiring measurement reports prepared in the terminals 3.

FIG. 5 gives an example of the measurement reports which were prepared by the "Terminal A" and "Terminal C" and were transmitted via the "Base Station C" to the measurement information acquiring unit 41. The "Terminal A" and "Terminal C" are connected to the "Base Station C". The measurement report shows that the receiving strengths from the "Base Station A", "Base Station B", and "Base Station C", measured at the "Terminal A", are "−60 dBm", "−100 dBm", and "−20 dBm", respectively. Further, the measurement report shows that the receiving strengths from the "Base Station C" and "Base Station E" measured at the "Terminal C" are "−30 dBm" and "−50 dBm", respectively. The measurement report may include a list of the base stations 4 and macrocell base stations 5 to which the terminals 3 can be connected.

The measurement information acquiring unit 41 may request the measurement information to the base station 4 by, for example, transmitting a predetermined measurement request signal. The measurement information acquiring unit 41 receives the measurement information which was transmitted from the base station 4 in response to the measurement request signal. Further, the measurement information acquiring unit 41 may acquire the channel quality information by measuring the quality of the communication channel with the base station 4.

Refer to FIG. 3. The setting unit 42 designates the base stations 4 which transmit the distribution data to the terminals for distribution. Further, the setting unit 42 determines the transmission power strengths of the base stations 4 which transmit the distribution data and also determines other communication parameters. The setting unit 42 is provided with a base station identifying unit 50, base station designating unit 51, and power determining unit 52.

The base station identifying unit 50 identifies the base stations 4 which can be connected to the terminals 3 for each terminal 3. For example, the base station identifying unit 50 may identify the base stations 4 which can be connected to the terminals for distribution based on the measurement report generated by the terminals 3.

The base station designating unit 51 selects the base stations 4 which transmit the distribution data to the terminals for distribution from among the base stations 4 identified by the base station identifying unit 50 and then determines a set S of base stations 4. At this time, the base station identifying unit 51 determines the set S so that all terminals for distribution can be connected to one or more base stations 4 included in the set S.

For example, the base station designating unit 51 determines a group GT of terminals for distribution for each distribution data. The base station designating unit 51 identifies base stations which can be connected to the terminals 3 for each of the terminals 3 included in the group GT and then determines a group GB of base stations obtained by totaling up these base stations. The base station designating unit 51 selects base stations to be added to the set S from the group GB so that all terminals for distribution can be connected to one or more base stations 4 included in the set S.

At the processing for determination of the set S, the base station designating unit 51 executes calculations for decreasing the number of the base stations to be included in the set S. The base station designating unit 51 designates the determined set S as the set of base stations 4 which transmit the distribution data to the terminals 3. The processing for determination of the set S and processing for calculations for decreasing the number of base stations by the base station designating unit 51 will be explained later.

The power determining unit 52 determines the transmission power strengths of the base stations 4 which were designated by the base station designating unit 51. For example, the power determining unit 52 may identify the terminal 3 having the worst receiving strength from a base station 4, among the terminals 3 which can be connected to the base stations 4, when determining the transmission power strength, for each base station 4. The power determining unit 52 may determine the transmission power strength of the base station 4 so that the receiving strength of this terminal 3 satisfies the required quality of reception of this terminal 3. For example, the power determining unit 52 may determine the transmission power strengths of the base stations 4 so that the receiving power strengths of the terminals 3 satisfy the minimum quality of reception which is required for the reception of the distribution data. By suppressing the transmission power strengths of the base stations 4 in this way, it becomes possible to reduce interference among the base stations 4.

When determining the quality of reception which is required for the reception of the distribution data, the power determining unit 52 may determine, for example, a QoS (Quality of Service) class in accordance with the type of the distribution data, i.e., whether the distribution data is moving picture data or audio data. Further, the power determining unit 52 may determine the QoS class in accordance with the quality of the distribution data such as the data rate of the distribution data. The power determining unit 52 may determine the quality of reception which is required for the reception of the distribution data in accordance with the QoS class.

The setting unit 42 determines the communication parameters to be used, which are set for the terminals 3 and the base stations 4 of the set S, in accordance with the set of the base stations 4 which transmit the distribution data to the terminals 3. The communication parameters concerning the terminals 3 may be, for example, the identification information of the base stations 4 from which the terminals 3 receive the distribution data. The communication parameters concerning the base stations 4 are, for example, parameters concerning the frequency resource used, time slot, and transmission code scheme. The setting unit 42 outputs these communication parameters and information concerning the transmission power strengths to the control unit 44.

The distribution data transfer unit 43 transfers the distribution data to the base stations 4 which are included in the set S which is determined by the base station designating unit 51. In other embodiments, the distribution data transfer unit 42 may be a component independent from the data distribution control unit 20. The control unit 44 receives, from the setting unit 42, communication parameters and transmission power strengths and sets them in the terminals 3 and base stations 4.

Figure 6:
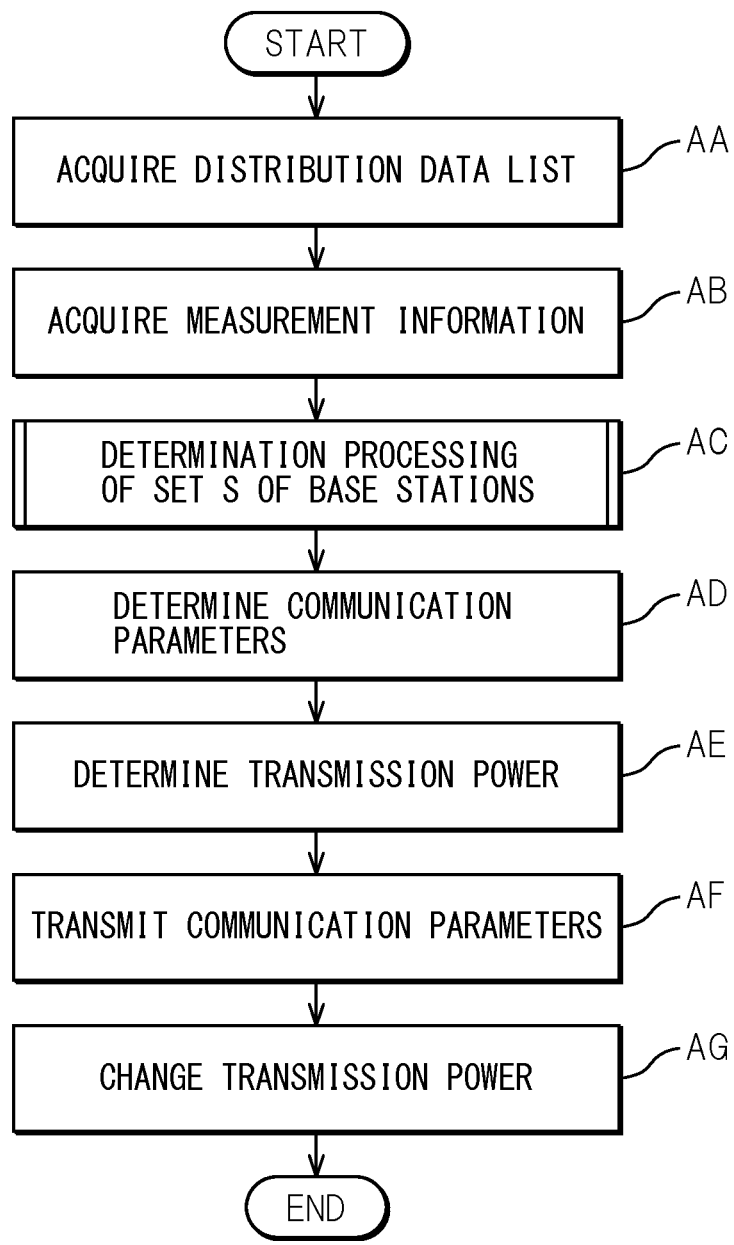
FIG. 6 is an explanatory view of a first example of processing of the data distribution control unit.

Next, the processing performed by the data distribution control unit 20 will be explained. FIG. 6 is an explanatory view of a first example of the processing of the data distribution control unit 20. Note that, in other embodiments, the operations of the following operations AA to AG may be steps as well.

In Operation AA, the terminal identifying unit 40 acquires the distribution data list from the terminal control apparatus 12. The terminal identifying unit 40 identifies the terminals for distribution according to the distribution data list. In Operation AB, the measurement information acquiring unit 41 acquires the measurement information. The base station identifying unit 50 identifies the base stations 4 which can be connected to the terminals 3 based on the acquired measurement information.

In Operation AC, the base station designating unit 51 selects the base stations 4 which transmit the distribution data to the terminals for distribution from among the base stations 4 which are identified by the base station identifying unit 50 and then determines the set S of the base stations 4. In Operation AC, the base station designating unit 51 performs the calculations for decreasing the number of base stations included in the set S. Details of Operation AC will be explained later.

In Operation AD, the setting unit 42 determines the communication parameters to be used which are set in the terminals 3 and base stations 4 based on the set S determined in Operation AC. In Operation AE, the power determining unit 52 determines the transmission power strengths of the base stations 4 which transmit the distribution data.

In Operation AF, the setting unit 42 transmits the communication parameters determined in Operation AF to the base stations 4 and terminals 3. In Operation AG, the transmission power strengths determined in Operation AE are set in the base stations 4 so as to change the transmission power strengths of the base stations 4.

Next, the processing for determination of the set S of base stations which is performed in Operation AC in FIG. 6 will be explained. The base station designating unit 51 determines the set S so that all of the terminals for distribution identified in Operation AA in FIG. 6 can be connected to one or more base stations 4 in the set S of base stations 4. At this time, the base station designating unit 51 determines the set S according to an algorithm for determination for decreasing the number of base stations 4 so that the number of the base stations 4 included in the set S becomes as small as possible.

For example, the base station unit 51 may determine the set S so as to decrease the number of base stations 4 by utilizing an algorithm whereby a base station 4 which can be connected to multiple terminals 3 is selected, as an element of the set S, prior to a base station 4 which can be connected to only one terminal 3. An example of such an algorithm is an algorithm for retrieving the smallest combination from among all combinations of base stations to which all of the terminals for distribution can be connected.

Figure 7:
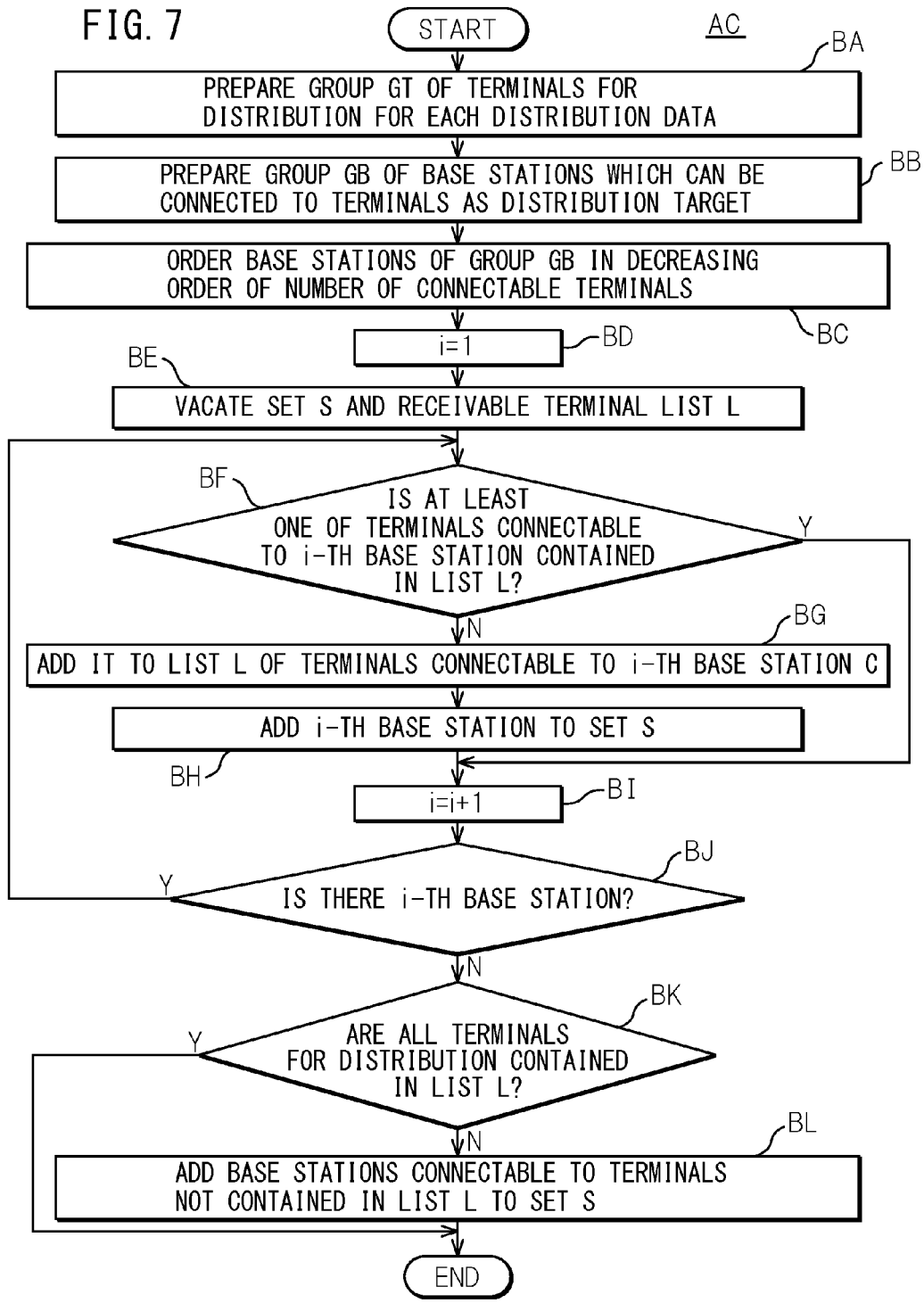
FIG. 7 is an explanatory view of a first example of processing for determination of a set S of base stations.

In order to decrease the number of elements of the set S, a variety of algorithms for determination can be employed. FIG. 7 is an explanatory diagram of an example of the processing for determination of the set S of base stations. The algorithm explained below with reference to FIG. 7 decreases the number of elements of the set S by including, in the set S with a higher priority level, the base stations 4 which can be connected to a larger number of terminals 3. Below, the processing depicted in FIG. 7 will be explained. In other embodiments, operations of the following Operations BA to BL may be steps as well.

In Operation BA, the base station designating unit 51 determines the group GT of terminals for distribution for each distribution data by using the distribution data list received by the terminal identifying unit 40. The base station designating unit 51 performs the following Operations BB to BL for each distribution data.

In Operation BB, the base station designating unit 51 identifies the base stations which can be connected to the terminals 3, for each terminal 3, included in the group GT based on the information of the base stations 4 which can be connected to the terminals 3 identified by the base station identifying unit 50 and then determines the group GB of base stations obtained by totaling up these base stations. FIG. 8 is a diagram which depicts an example of the group GB of base stations.

The group GB depicted in FIG. 8 shows that the terminals for distribution of certain distribution data are the "Terminal A" to "Terminal J" and that the "Terminal B", "Terminal E", "Terminal F", and "Terminal G" can be connected to the "Base Station A". Further, the list of FIG. 8 depicts that the "Terminal A", "Terminal C", and "Terminal D" can be connected to the "Base Station D" and that the "Terminal B" and "Terminal I" can be connected to the "Base Station B". Further, the list of FIG. 8 depicts that the "Terminal H" and "Terminal J" can be connected to the "Base Station E", the "Terminal I" and "Terminal A" can be connected to the "Base Station C", and the "Terminal B" can be connected to the "Base Station F".

Refer to FIG. 7. In Operation BC, the base station designating unit 51 arranges the base stations 4 included in the group GB in descending order of the number of connectable terminals. The rightmost column in Table depicted in FIG. 8 is an example of arranging the "Base Station A" to "Base Station F". The orders of the "Base Station A", "Base Station D", "Base Station B", "Base Station E", "Base Station C", and "Base Station F" are "1", "2", "3", "4", "5", and "6", respectively.

In Operation BD, the base station designating unit 51 sets the value of variable "i" to "1", which variable "i" designates the base stations 4 included in the group GB. In Operation BE, the base station designating unit 51 clears the set S and receivable terminal list L. The receivable terminal list L is a list of terminals 3 which can be connected to any of the base stations 4 included in the set S, that is, a list of the terminals 3 which can receive the distribution data.

In Operation BF, the base station designating unit 51 judges whether at least one of the terminals 3 which can be connected to the i-th base station 4 is contained in the list L. When at least one of the terminals 3 which can be connected to the i-th base station 4 is contained in the list L (Operation BF: Y), the processing proceeds to Operation BI. When a terminal 3 which can be connected to the i-th base station 4 is not contained in the list L at all (Operation BF: N), the processing proceeds to Operation BG.

In Operation BG, the base station designating unit 51 adds the terminal 3 which can be connected to the i-th base station 4 to the list L. In Operation BH, the base station designating unit 51 adds the i-th base station 4 to the set S. In Operation BI, the base station designating unit 51 increments the variable "i" by one. In Operation BJ, the base station designating unit 51 judges whether the i-th base station exists. When the i-th base station exists (Operation BJ: Y), the processing returns to Operation BF. When the i-th base station does not exist (Operation BJ: N), the processing proceeds to Operation BK.

Figure 9:
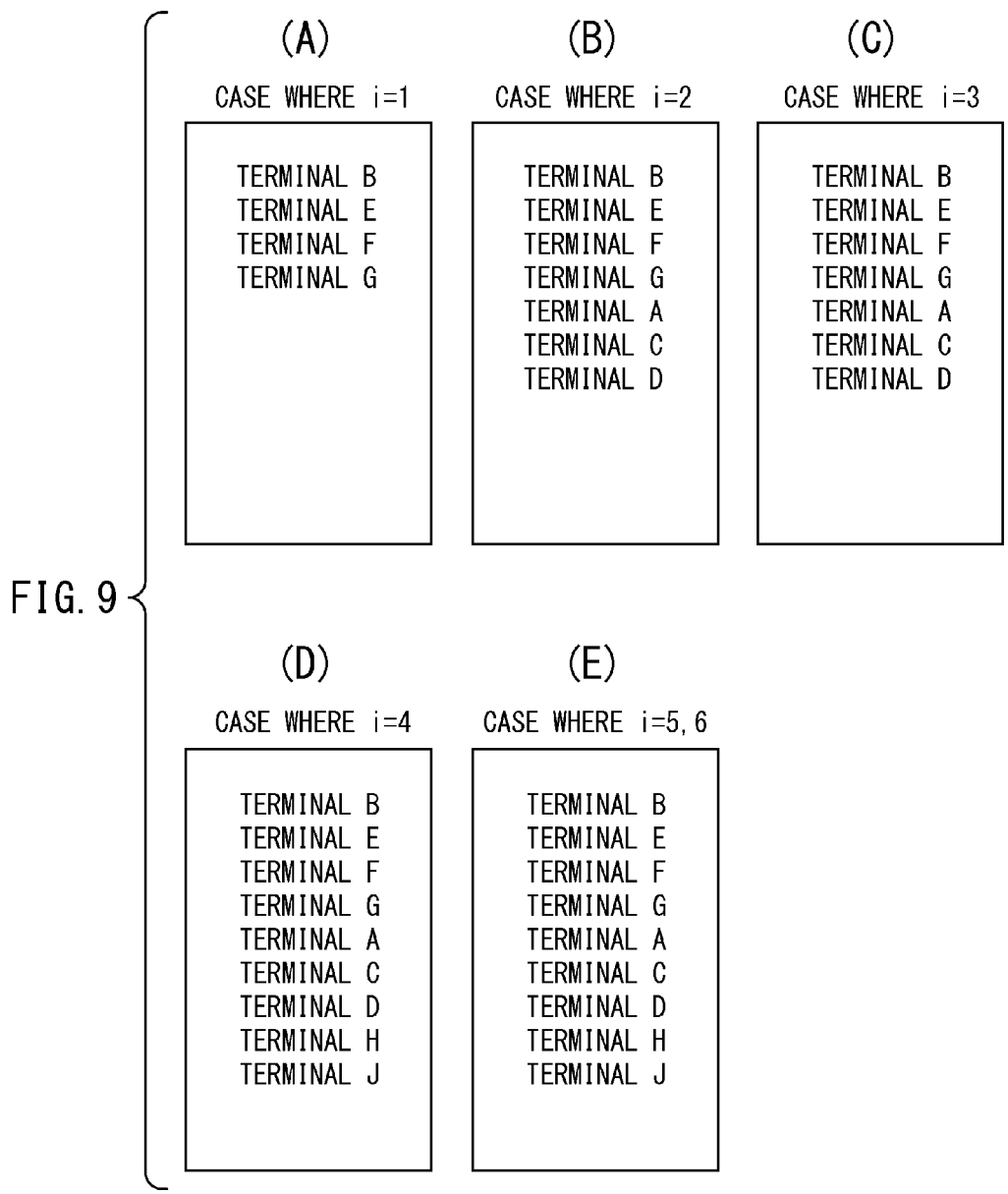
FIG. 9 is a view which depicts examples of a receivable terminal list L.
Figure 10:
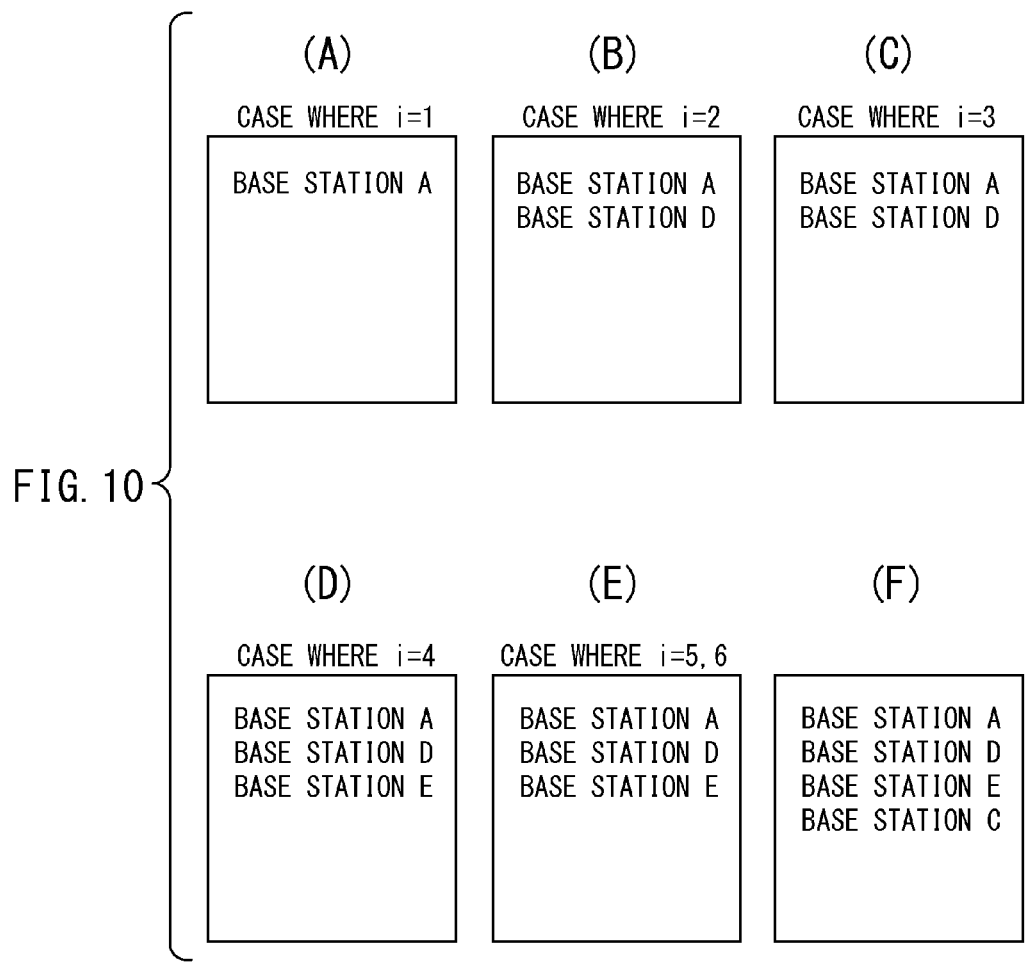
FIG. 10 is a view which depicts examples of the set S.

An example of the change of the receivable terminal list L and set S among the above Operations BC to BJ will be explained. As an example, a case where the list of base stations 4 which can be connected to the terminals for distribution is given in FIG. 8 will be assumed. (A) of FIG. 9 to (E) of FIG. 9 are diagrams depicting examples of the receivable terminal list L. (A) of FIG. 10 to (F) of FIG. 10 are diagrams depicting examples of the set S.

When the variable "i" is "1", Operation BF is performed in a state where the list L is still empty. Accordingly, none of the "Terminal B", "Terminal E", "Terminal F", and "Terminal G" which can be connected to the first "Base Station A" is contained in the list L. For this reason, in Operation BG, the "Terminal B", "Terminal E", "Terminal F", and "Terminal G" are added to the set S. Further, in Operation BH, the "Terminal A" is added to the set S. This situation is depicted in (A) of FIG. 9 and (A) of FIG. 10.

When the variable "i" is "2", Operation BF is performed in a state where the "Terminal B", "Terminal E", "Terminal F", and "Terminal G" are contained in the list L. In the list L, none of the "Terminal A", "Terminal C", and "Terminal D" which can be connected to the second "Base Station D" is contained. For this reason, in Operation BG, the "Terminal A", "Terminal C", and "Terminal D" are added to the list L. Further, the "Base Station D" is added to the set S in Operation BH. This situation is depicted in (B) of FIG. 9 and (B) of FIG. 10.

When the variable "i" is "3", Operation BF is performed in a state where the list L contains the "Terminal B", "Terminal E", "Terminal F", "Terminal G", "Terminal A", "Terminal C", and "Terminal D". The list L contains the "Terminal B" which can be connected to the third "Base Station B". For this reason, although the "Terminal I" not contained in the list L can be connected to the "Base Station B" as well, neither the "Terminal B" nor "Terminal I" are added to the list L. Further, the "Base Station B" is not added to the set S either. This situation is depicted in (C) of FIG. 9 and (C) of FIG. 10.

When the variable "i" is "4", Operation BF is performed in a state where the list L contains the "Terminal B", "Terminal E", "Terminal F", "Terminal G", "Terminal A", "Terminal C", and "Terminal D". The list L contains neither the "Terminal H" nor "Terminal J" which can be connected to the fourth "Base Station E". For this reason, in Operation BG, the "Terminal H" and "Terminal J" are added to the set S. This situation is shown in (D) of FIG. 9 and (D) of FIG. 10.

In the same way, when the variables "i" are "5" and "6", the "Terminal A" which can be connected to the fifth "Base Station C" and the "Terminal B" which can be connected to the sixth "Base Station F" are already contained in the list L. For this reason, nothing is added to the list L and set S. This situation is depicted in (E) of FIG. 9 and (E) of FIG. 10.

According to Operations BC to BJ, a base station 4 which can be connected to a larger number of terminals 3 is stored in the set S prior to a base station 4 which can be connected to a smaller number of terminals 3. Moreover, overlapping of the terminals 3 which can be connected to the base stations 4 does not occur among the base stations 4 which are stored in the set S. Accordingly, whenever one base station 4 is added to the set S, the terminal 3 of the list L increases and the ratio can be raised. That is, whenever one base station 4 is added to the set S, a ratio of increase of the terminal 3, which can distribute the data, can be raised. For this reason, the number of base stations included in the set S can be decreased.

Refer to FIG. 7. In Operation BK, the base station designating unit 51 judges whether all terminals for distribution are contained in the list L. When all terminals for distribution are contained in the list L (Operation BK: Y), the processing ends. When all terminals for distribution are not contained in the list L (Operation BK: N), the processing proceeds to Operation BL.

In Operation BL, the base station designating unit 51 adds a base station to the set S, which can be connected to a terminal which is not contained in the list L. In the example of the list of base stations 4 depicted in FIG. 8, the terminal I is not yet contained in the list L. Accordingly, the base station designating unit 51 adds, to the set S, the "Base Station B" and "Base Station C" to which the "Terminal I" can be connected. When multiple base stations can be selected, the base station designating unit 51 may add a base station having a higher quality of reception to the set S. An example of the set S where the "Base Station C" is added will be depicted in (F) of FIG. 10. After the Operation BL, the processing ends.

Figure 11:
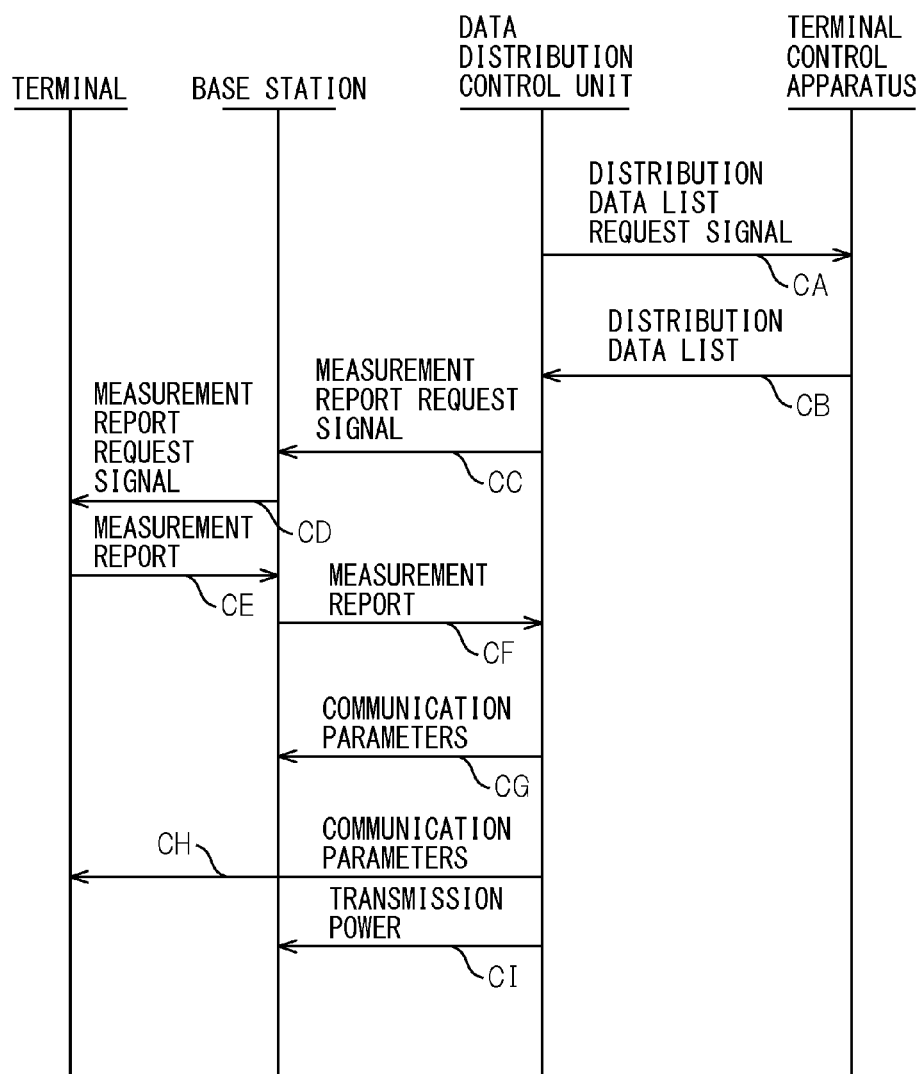
FIG. 11 is a view which depicts a sequence of signals which are transmitted in the processing in FIG. 4.

Next, the sequence of signals will be explained, which signals are transmitted and received at elements of the data distribution system 1 in the above processing. FIG. 11 is a view which depicts a sequence of signals. Note that, in other embodiments, operations of the following Operations CA to CI may be steps as well.

In Operation CA, the terminal identifying unit 40 of the data distribution control apparatus 20 transmits a distribution data list request signal to the terminal control apparatus 12. In Operation CB, the terminal control apparatus 12 transmits the distribution data list to the terminal identifying unit 40.

In Operation CC, the measurement information acquiring unit 41 of the data distribution control apparatus 20 transmits the measurement information request signal to the base stations 4. In Operation CD, the base stations 4 transmit the measurement information request signals, to the terminals 3, for requesting the measurement information. In response to the measurement information request signals, the terminals 3 transmit the measurement information concerning the terminals 3 to the base stations 4 in Operation CE. In Operation CF, the base stations 4 transmit, to the measurement information acquiring unit 41, the measurement information acquired from the terminals 3 and the measurement information concerning the base stations 4 which were measured at the base stations 4.

After that, the setting unit 42 of the data distribution control apparatus 20 determines the set S of the base stations 4 which transmit the distribution data and then determines the transmission power strengths of the base stations 4 which transmit the distribution data and other communication parameters. In Operations CG and CH, the control unit 44 of the data distribution control apparatus 20 sets the communication parameters in the base stations 4 and terminals 3. In Operation CI, the control unit 44 sets the transmission power strengths in the base stations 4.

According to the present embodiment, the data distribution control apparatus 20 decreases the number of base stations 4 included in the set S of base stations 4 which transmit distribution data having the same content. For this reason, when the base stations 4 included in the set S do not use the same frequency resource, the wireless resources, which are utilized when the base stations 4 transmit distribution data having the same content, is reduced. For this reason, the efficiency of utilization of the wireless resources is improved. For example, when multiple base stations 4 transmit distribution data having the same content without use of an MBSFSN and the same frequency resource, the used amount of the frequency resources can be reduced.

Further, if the number of base stations 4 which transmit the distribution data having the same content is large, the efficiency of utilization of the communication channel for transmitting the distribution data to these base stations 4, that is, the "backhaul", decreases. According to the present embodiment, the number of base stations 4 which transmit the distribution data having the same content can be decreased, therefore the efficiency of utilization of the backhaul is improved as well.

Next, another embodiment of the data distribution control unit 20 will be explained. The data distribution control unit 20 in the present embodiment acquires frequency information indicating frequencies of the frequency resource to be used by the macrocell base stations 5 around the base stations 4 for the data transmission. The data distribution control unit 20 designates frequencies other than the frequencies indicated by this frequency information as the frequencies to be used for the transmission of the distribution data by the base stations 4.

In some cases, a macrocell base station 5 does not perform scheduling of the frequency resource. For example, when a macrocell base station 5 transmits the distribution data in the MBSFSN scheme, the frequency of the frequency resource used by the macrocell base station 5 is designated according to the MCE. For this reason, when a base station 4 transmits the distribution data by using the frequency used by the macrocell base station 5, interference arises with the transmission signal from the macrocell base station 5. In such case, in the present embodiment, interference between transmission signals of the base station 4 and macrocell base station 5 is prevented by using a frequency for the base station 4 other than the frequency used by the macrocell base station 5.

Figure 12:
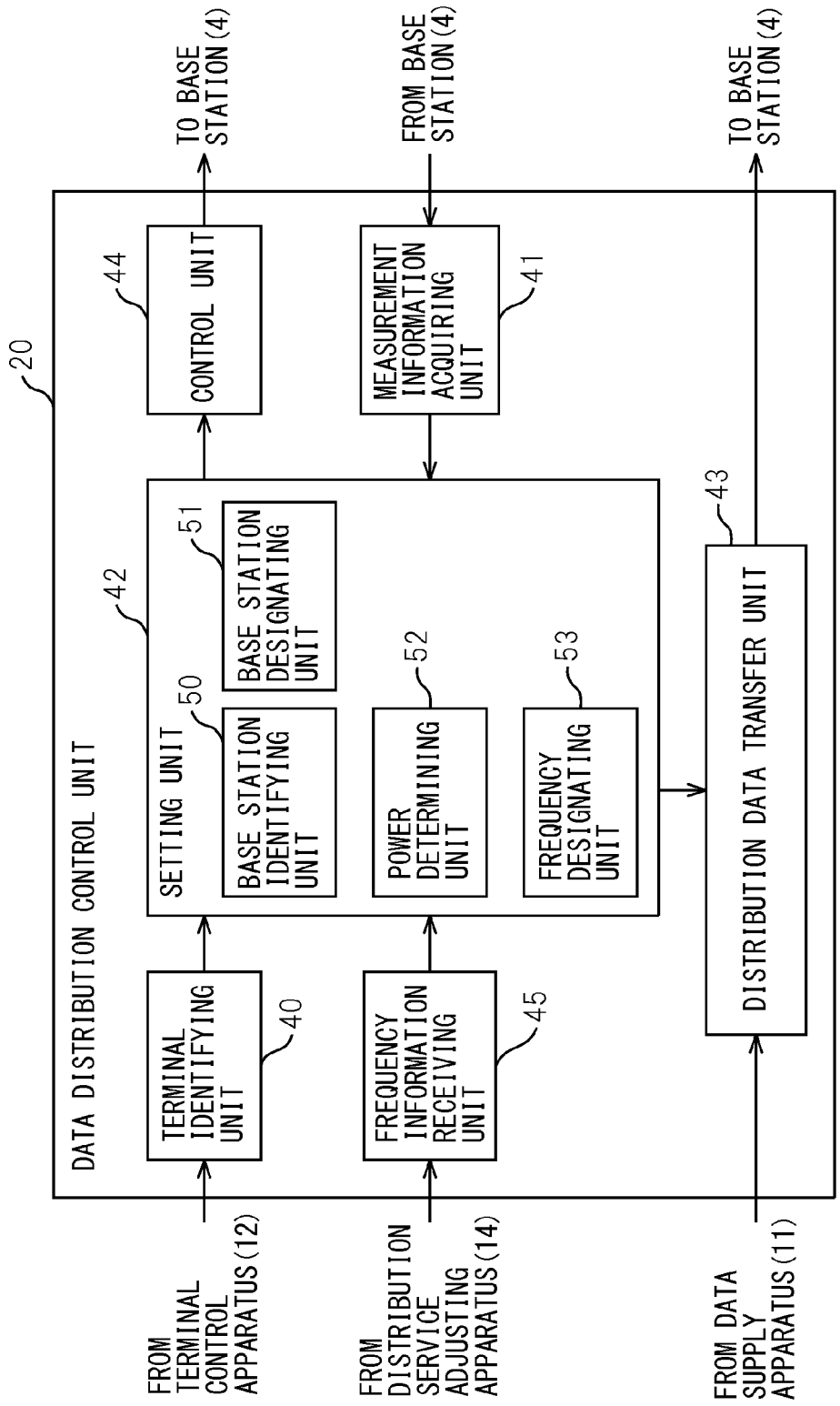
FIG. 12 is a view which represents a second example of the configuration of the data distribution control unit.

FIG. 12 is a view which represents a second example of the configuration of the data distribution control unit 20. The same notations will be attached to the same components as the components shown in FIG. 3. Operations of the components given the same notation are the same so long as not particularly explained otherwise. Further, other embodiments may be provided with the components shown in FIG. 12 and their functions as well.

The data distribution control apparatus 20 is provided with a frequency signal receiving unit 45. The setting unit 42 is provided with a frequency designating unit 53. The frequency signal receiving unit 45 receives, from the distribution service adjusting apparatus 14, the frequency information showing frequencies of the frequency resource used by the macrocell base stations existing around the base stations 4. The example of such a frequency resource may be a frequency which is used when the multiple macrocell base stations 5 distribute the information having the same content at the same frequency. Such a frequency resource may be, for example, a frequency resource which is utilized when distributing the distribution data in the MBSFSN scheme.

For example, the frequency signal receiving unit 45 transmits, to the distribution service adjusting apparatus 14, the frequency information request signal for requesting the frequency information. The frequency signal receiving unit 45 receives the frequency information which is transmitted from the distribution service adjusting apparatus 14 in response to the frequency information request signal.

FIG. 13 is a view which depicts an example of the frequency information request signal. The frequency information request signal may have the "base station identifier" and "coordinate information" as the information elements. The information element "base station identifier" is an identifier of the base station 4 included in the set S of base stations. The information element "coordinate information" is information showing the coordinates of each base station 4. In the example of FIG. 13, the coordinate information expressed by latitude and longitude is shown as the "coordinate information". However, position information of another coordinate system or another mode may be used. For example, the frequency information request signal in FIG. 13 shows that the location of the "Base Station A" is "35° 628912' North Latitude and 139° 723175' East Longitude", and the location of the "Base Station B" is "35° 629000' North Latitude and 139° 723180' East Longitude".

FIG. 14 is a view which depicts an example of the frequency information. The frequency information may have the "base station identifier" and "frequency" as the information elements. The information element "base station identifier" is an identifier of the base stations 4 which is included in the frequency information request signal. The information element "frequency" is the frequency of the frequency resource used by the macrocell base station 5 around each base station 4. The frequency information depicted in FIG. 14 shows that the macrocell base stations 5 around the "Base Station A", "Base Station B", "Base Station C", and "Base Station D" use the frequency resource of frequencies "1921 Mhz" and "1922 Mhz".

When determining the frequency resource which is used in each base station 4 included in the set S determined by the base station designating unit 51, the frequency designating unit 53 assigns the transmission frequencies of the distribution data sent from the base stations 4 from the frequencies other than the frequencies designated by the frequency information among the frequencies which can be assigned to the base stations 4.

Figure 15:
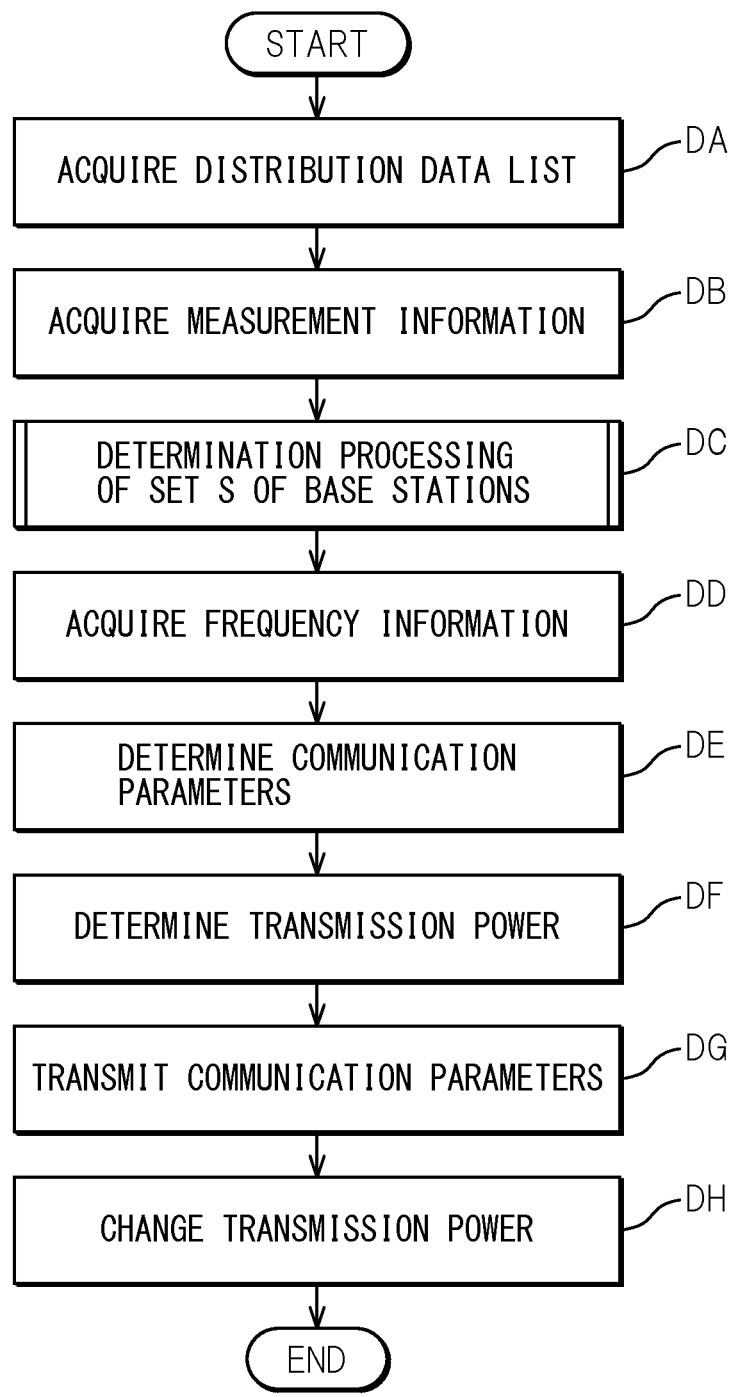
FIG. 15 is an explanatory view of a second example of the processing of the data distribution control unit.

Next, the processing of the data distribution control unit 20 depicted in FIG. 12 will be explained. FIG. 15 is an explanatory diagram of a second example of the processing of the data distribution control unit 20. Note that, in other embodiments, operations of the following Operations DA to DH may be steps as well.

The processing of Operations DA to DC is the same as that of Operations AA to AC in FIG. 6. In Operation DD, the frequency signal receiving unit 45 acquires the frequency information from the distribution service adjusting apparatus 14.

In Operation DE, the setting unit 42 determines the communication parameters to be used, which are set in the terminals 3 and base stations 4 in accordance with the set S determined in Operation AC. The frequency designating unit 53, when determining the frequency resource to be used in the base stations 4, assigns the transmission frequencies of the distribution data sent from the base stations 4, which are the frequencies other than the frequencies designated by the frequency information. The processing of Operations DF to DH is the same as that of Operations AE to AG in FIG. 6.

Figure 16:
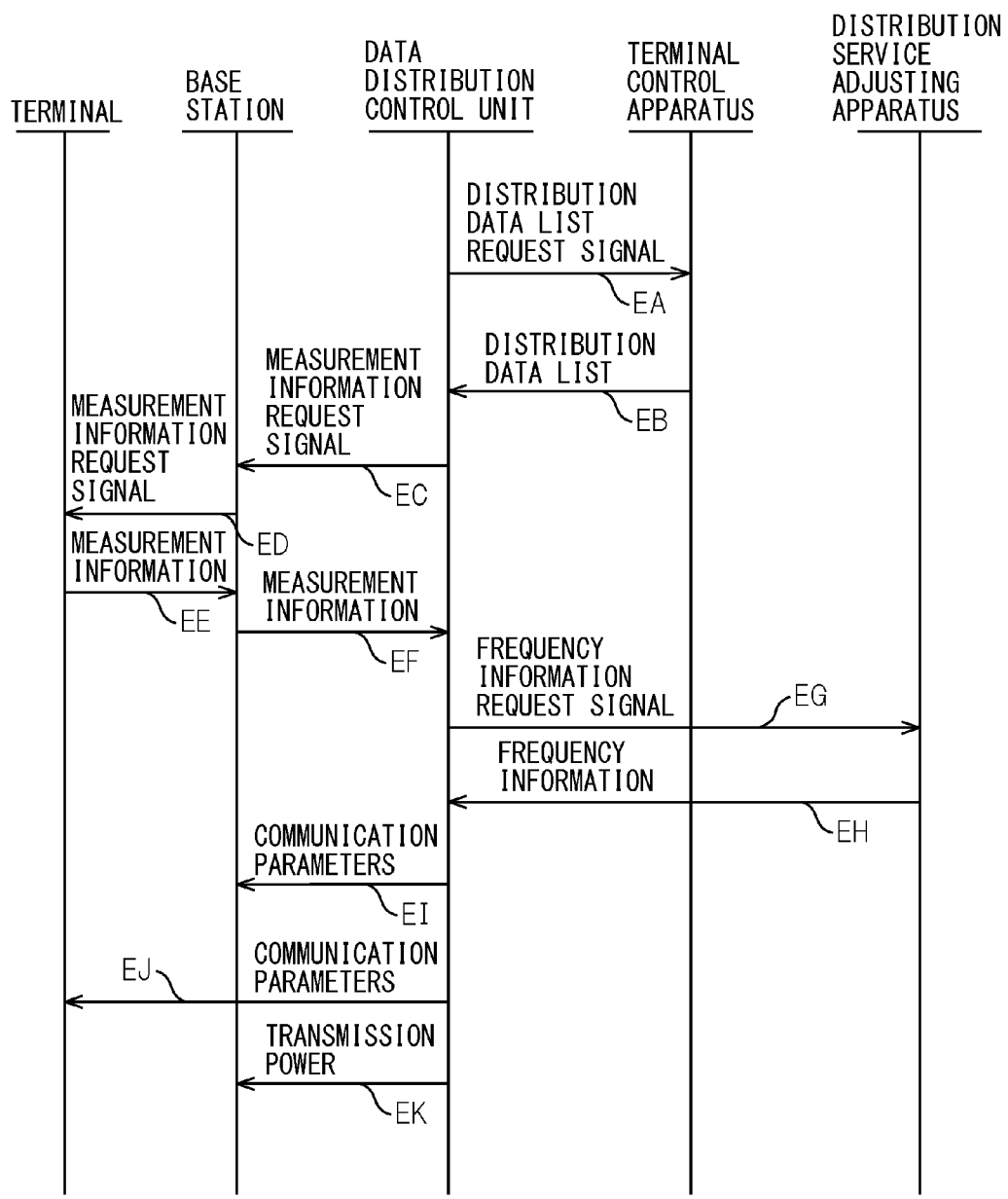
FIG. 16 is a view which depicts a sequence of signals which is transmitted in the processing in FIG. 15.

Next, a sequence of signals which are transmitted and received at the elements of the data distribution system 1 in the processing of FIG. 15 will be explained. FIG. 16 is a diagram which depicts a sequence of signals. Note that, in other embodiments, operations of the following Operations EA to EK may be steps as well.

The processing of Operations EA to EF is the same as that of Operations CA to CF in FIG. 11. In Operation EG, the frequency signal receiving unit 45 of the data distribution control apparatus 20 transmits the frequency information request signal to the distribution service adjusting apparatus 14. In Operation EH, the distribution service adjusting apparatus 14 transmits the frequency information to the frequency signal receiving unit 45.

After that, the setting unit 42 of the data distribution control apparatus 20 determines the set S of base stations 4 and then determines the transmission power strengths of the base stations 4, which transmit the distribution data, and other communication parameters. The frequency designating unit 53 assigns the transmission frequencies of the distribution data sent from the base stations 4, which are the frequencies other than the frequencies designated by the frequency information. The processing of Operations EI to EK after that is the same as that of Operations CG to CI in FIG. 11.

According to the present embodiment, the base station 4 transmits the distribution data by using a frequency resource other than the frequency resource which is used by the macrocell base stations 5 on the periphery. For this reason, for example, the base station 4 can prevent interference from occurring between the data which is being transmitted, without scheduling of the frequency resource, by the macrocell base station 5 and the distribution data which is being transmitted by the base station 4.

Next, another embodiment of the data distribution control unit 20 will be explained. The data distribution control unit 20 in the present embodiment judges whether the quality of the receiving channel, that is, the channel of backhaul, which is used by the base stations 4 for reception of distribution data satisfies the quality conditions for receiving the distribution data. The data distribution control unit 20 selects the set S of base stations 4 from among the base stations which receive the distribution data via the receiving channel satisfying the quality conditions for receiving the distribution data. In the present embodiment, the backhaul of the base stations 4 may be a communication channel for transmitting the distribution data from the connecting apparatus 13 to the base stations 4.

There is a case where the quality of communication of the backhaul of the base station 4 differs for each base station 4. Further, the QoS class of the distribution data sometimes differs for each distribution data. According to the present embodiment, deterioration of distribution data can be prevented, which may occur due to a transmission of distribution data to the base station 4 by using a channel which does not satisfy the channel quality conditions.

Figure 17:
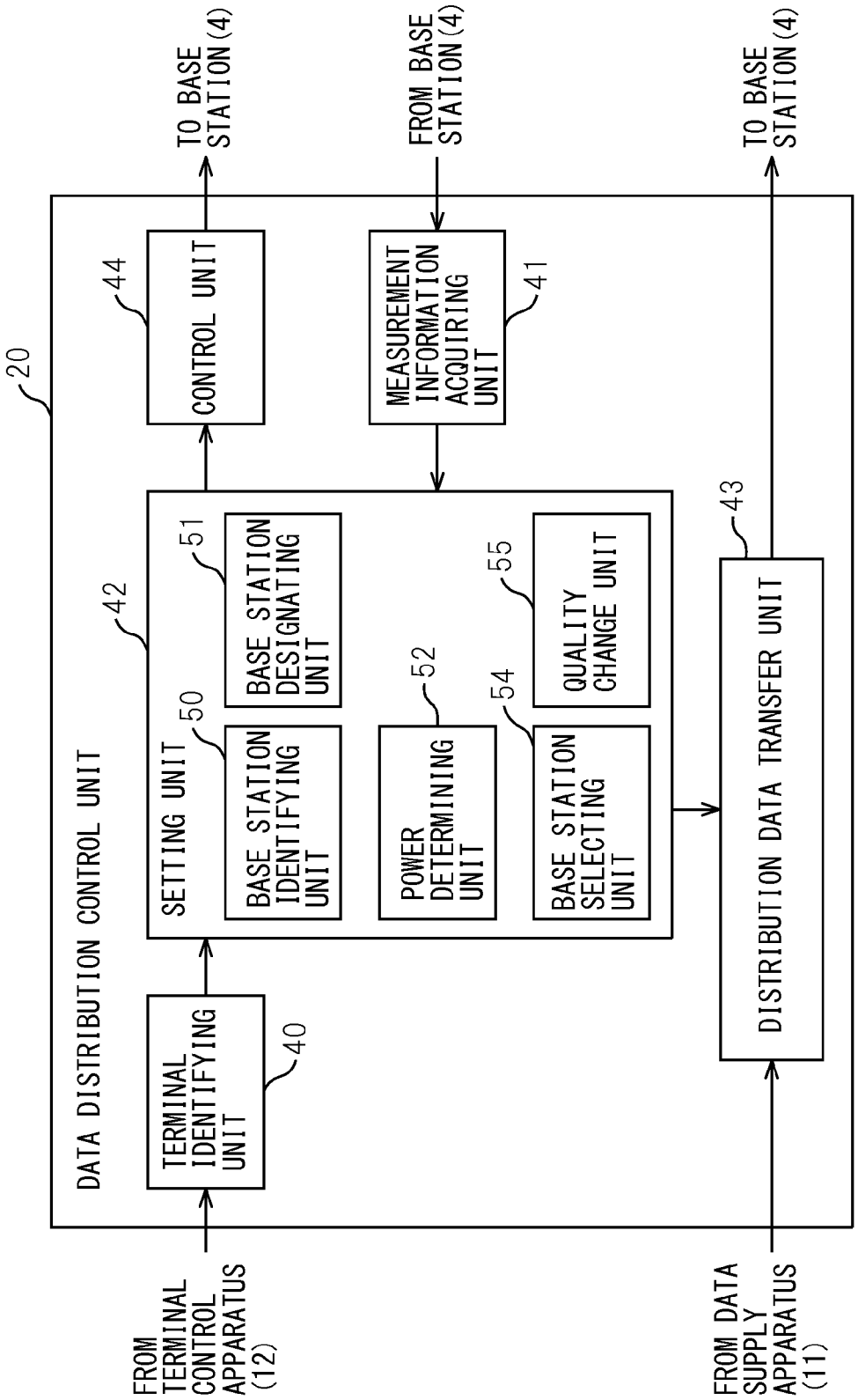
FIG. 17 is a view which represents a third example of the configuration of the processing of the data distribution control unit.

FIG. 17 is a view which represents a third example of the configuration of the data distribution control unit 20. The same notations will be attached to the same components as the components shown in FIG. 3. Operations of the components given the same notation are the same so long as not particularly explained otherwise. Further, other embodiments may be provided with the components shown in FIG. 17 and their functions as well.

The setting unit 42 is provided with a base station selecting unit 54 and quality change unit 55. The base station selecting unit 54 acquires, from the measurement information acquiring unit 41, the channel quality information which relates to the speed and quality of the channel between each base station 4 and the connecting apparatus 13. For example, the channel quality information may be information concerning the available bandwidth, delay time of the channel, packet loss rate, etc.

Further, the base station selecting unit 54 judges the channel quality condition for receiving the distribution data. The base station selecting unit 54 may determine the QoS class in accordance with the type of the distribution data. Further, the base station selecting unit 54 may determine the QoS class in accordance with the quality of the distribution data such as the data rate of the distribution data. The base station selecting unit 54 may judge the channel quality condition for receiving the distribution data in accordance with the QoS.

The base station selecting unit 54 selects a base station 4 which receives the distribution data via the receiving channel satisfying the channel quality conditions for receiving the distribution data among the base stations 4 identified by the base station identifying unit 50. The base station designating unit 51 selects the base station 4 to be included in the set S among the base stations 4 which are selected by the base station selecting unit 54. For example, the base station designating unit 51 may exclude the base station 4, which is not selected by the base station selecting unit 54, from the group GB when selecting the base station to be added to the set S from the inside of the group GB of base stations to which the terminals for distribution can be connected.

The quality change unit 55 lowers the quality of the distribution data to be distributed to the base stations 4, in a case where there is a terminal, among the terminals for distribution, which cannot receive the distribution data, that is a case where there is a terminal 3, among the terminals for distribution, which cannot be connected to any base station 4 in the set S. For example, when multiple distribution data having different qualities for the same content are distributed, the quality change unit 55 sends an instruction, to the terminal control apparatus 12, so that distribution data is supplied, which data has a lower quality than the quality which is being selected at present. By lowering the quality of the distribution data, the population selecting the base station 4 to be included in the set S becomes large, and therefore the terminals 3 being able to receive the distribution data can be increased.

Figure 18:
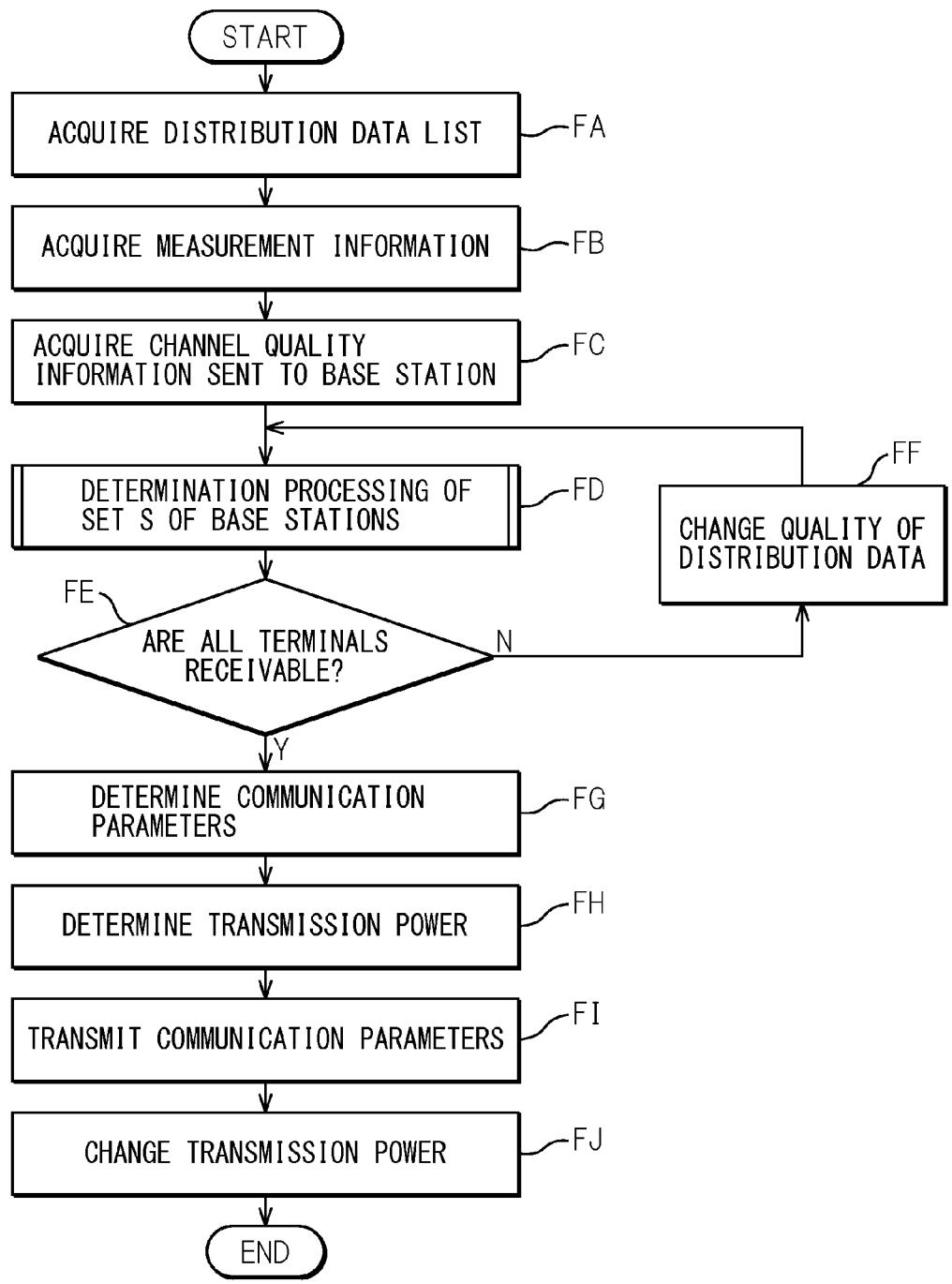
FIG. 18 is an explanatory view of a third example of the processing of the data distribution control unit.

Subsequently, the processing of the data distribution control unit 20 represented in FIG. 17 will be explained. FIG. 18 is an explanatory diagram of a third example of the processing of the data distribution control unit 20. Note that, in other embodiments, operations of Operations FA to FJ may be steps as well.

The processing of Operations FA and FB is the same as that of Operations AA and AB in FIG. 6. In Operation FC, the base station selecting unit 54 acquires, from the measurement information acquiring unit 41, the channel quality information of the channel between each base station 4 and the connecting apparatus 13.

In Operation FD, the base station designating unit 51 determines the set S of base stations 4. At this time, the base station selecting unit 54 selects the base station 4 satisfying the channel quality conditions for receiving the distribution data. The base station designating unit 51 selects the base station 4 to be included in the set S from the base stations 4 selected by the base station selecting unit 54.

In Operation FE, it is judged whether the distribution data can be distributed to all terminals 3. When the distribution data can be distributed to all terminals 3 (Operation FE: Y), the processing proceeds to Operation FG. When there is a terminal to which the data cannot be distributed (Operation FE: N), the processing proceeds to Operation FF.

In Operation FF, the quality change unit 55 lowers the quality of the distribution data to be distributed to the base stations 4. After that, the processing returns to Operation FD. The processing of Operations FG to FJ is the same as that of Operations AD to AG in FIG. 6.

In the above example, a base station 4, which did not satisfy the QoS class of the distribution data, was excluded from the population for selecting base stations 4 identified by the base station identifying unit 50, that is, the base stations 4 to be included in the set S. In place of this, it may be possible to judge whether the receiving channel of the base station 4, included in the set S after determining the set S, satisfies the QoS class and, if the QoS class is not satisfied, the processing for determination of the set S may be redone.

According to the present embodiment, it is possible to prevent deterioration of the distribution data, which may occur due to transmission of distribution data using backhaul which does not satisfy the channel quality conditions for transmitting the distribution data.

Next, another embodiment of the data distribution control unit 20 will be explained. When the terminal 3 can receive the data from the macrocell base station 5, distribution data the same as this data may not be distributed from the base station 4. For this reason, the data distribution control unit 20, in the present embodiment, acquires the data designation information indicating the distribution data which is being distributed from the macrocell base station 5. The data distribution control unit 20 suspends the transmission of the distribution data from the base station 4, when the terminal 3 can receive, from the macrocell base station 5, the same data as the distribution data transmitted by the base station 4 as well.

Figure 19:
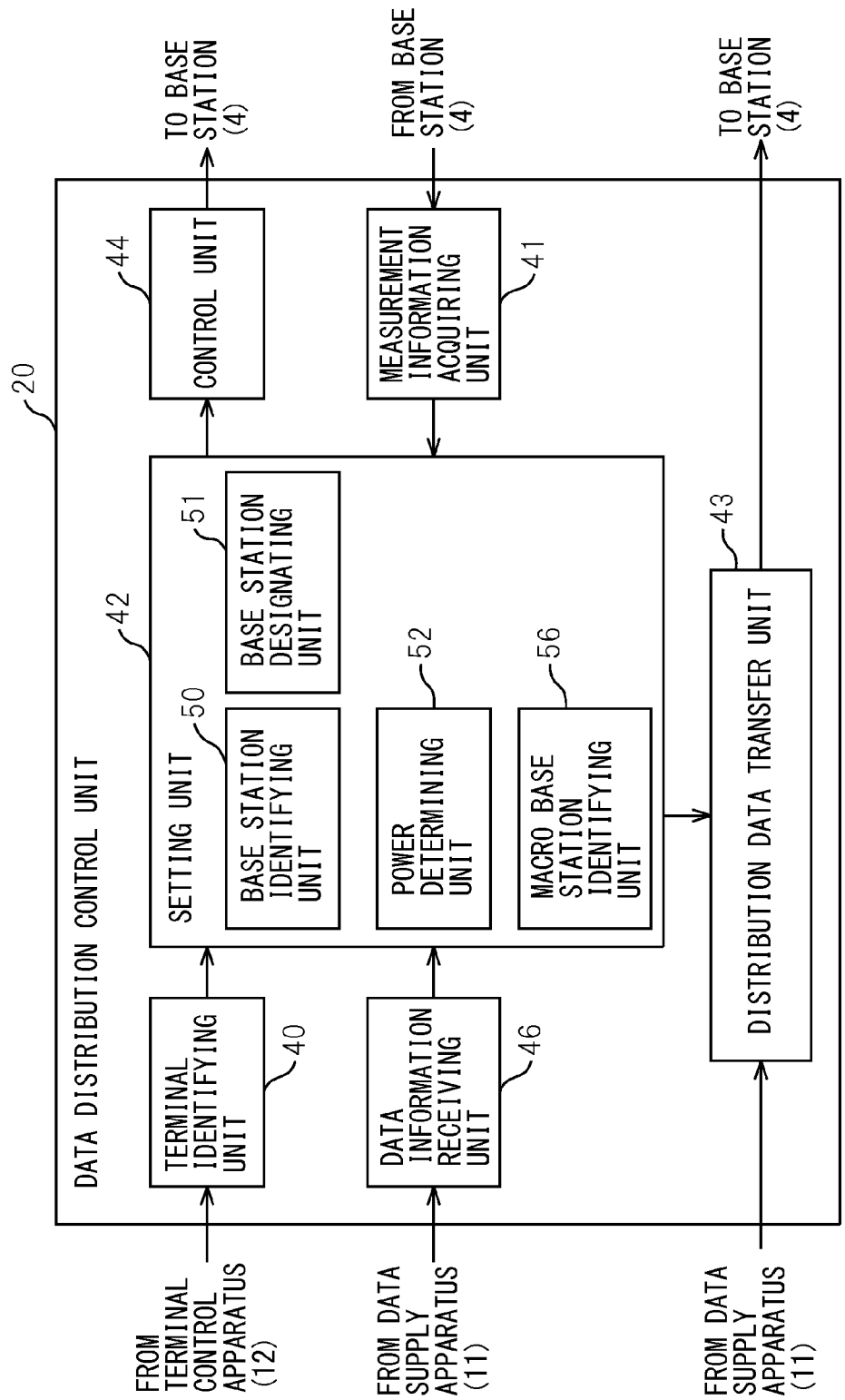
FIG. 19 is a view which represents a fourth example of the configuration of the data distribution control unit.

FIG. 19 is a view which represents a fourth example of the configuration of the data distribution control unit 20. The same notations will be given to the same components as the components shown in FIG. 3. Operations of the components given the same notations are the same so long as not particularly explained otherwise. Further, other embodiments may be provided with the components shown in FIG. 19 and their functions as well.

The data distribution control unit 20 is provided with a data information receiving unit 46. The setting unit 42 is provided with a macrocell base station identifying unit 56. The data information receiving unit 46 receives the data designation information for designating the data to be distributed from the macrocell base station 5 to the terminal 3. For example, the data information receiving unit 46 transmits, to the data supply apparatus 11 supplying the distribution data, data designation information request signal requesting the data designation information. The data designation information request signal may include the designation of the identifier of the macrocell base station 5. The data supply apparatus 11 transmits the data designation information to the data information receiving unit 46. The data designation information designates the distribution data which was designated by the data designation information request signal and is being distributed to the macrocell base station 5.

FIG. 20 is a diagram which depicts an example of the data designation information. The data designation information may have a "macrocell base station identifier" and "distribution data identifier", as the information elements. The information element "macrocell base station identifier" is an identifier of the macrocell base station 5 which was designated by the data designation information request signal. The information element "distribution data identifier" is an identifier of the distribution data which is distributed from each macrocell base station. The data designation information, in FIG. 20, shows that the audiovisual data of "News Program X" and "Drama Program Y" are distributed from the "Macrocell Base Station A" and "Macrocell Base Station B".

The macrocell base station identifying unit 56 acquires the measurement information concerning the terminals for distribution from the measurement information acquiring unit 41. The macrocell base station identifying unit 56 identifies the macrocell base stations to which the terminals for distribution can be connected based on the measurement information. FIG. 21 is a view which depicts an example of the macrocell base stations 5 which can be connected to the terminals for distribution.

In the example depicted in FIG. 21, "Terminal A" and "Terminal B" can be connected to the "Macrocell Base Station A", and the "Terminal B", "Terminal C", and "Terminal D" can be connected to the "Macrocell Base Station B". Accordingly, the "Terminal A" can receive the "News Program X", the "Terminal B" can receive the "News Program X" and "Drama Program Y", and the "Terminal C" and "Terminal D" can receive the "Drama Program Y".

When determining the group GT of terminals for distribution for each distribution data in the processing for determining the set S of base stations 4, the base station designating unit 51 does not include the terminal 3 in the group GT, which terminal is capable of receiving the same distribution data from the macrocell base station 5. That is, in Operation BA of the processing for determining the set S of base stations 4 shown in FIG. 7, the terminals 3, which can receive the same distribution data from the macrocell base station 5, are excluded from the group GT.

For example, in the example of terminals and base stations depicted in FIG. 21, when determining the group GT of terminals for distribution of the "News Program X", the base station designating unit 51 does not include the "Terminal A" and "Terminal B" in the group GT. In the same way, the base station designating unit 51 does not include the "Terminal B", "Terminal C", and "Terminal D" in the group GT, when the base station designating unit 51 determines the group GT of terminals for distribution of the "Drama Program Y".

As a result, when the base station designating unit 51 determines the group GB of base stations which can be connected to the terminals for distribution of certain distribution data, if all of terminals, which can be connected to a certain base station 4, can receive this distribution data from the macrocell base station 5, this base station 4 is not included in the group GB. For this reason, in the processing of selecting the base station to be added to the set S from the inside of the group GB, which is carried out after that, this base station 4 is no longer selected as the base station to be added to the set S. Accordingly, this base station 4 is no longer included in the set S of base stations, and therefore the base station designating unit 51 does not select this base station 4 as the base station which transmits this distribution data.

Figure 22:
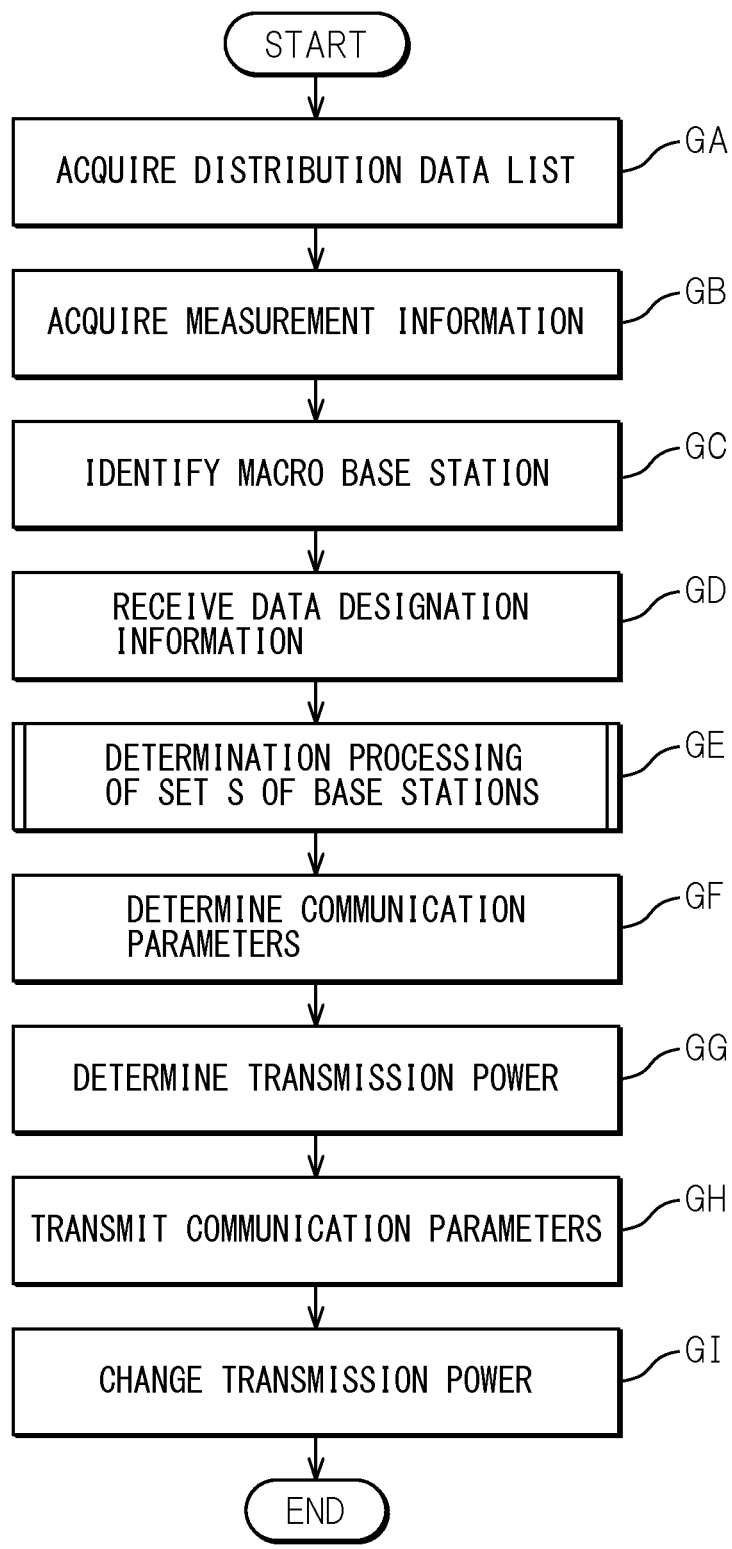
FIG. 22 is an explanatory view of a fourth example of the processing of the data distribution control unit.

Subsequently, the processing of the data distribution control unit 20 represented in FIG. 19 will be explained. FIG. 22 is an explanatory diagram of a fourth example of the processing of the data distribution control unit 20. Note that, in other embodiments, operations of the following Operations GA to GI may be steps as well.

The processing of Operations GA and GB is the same as that of Operations AA and AB in FIG. 6. In Operation GC, the macrocell base station identifying unit 56 identifies the macrocell base stations connectable by the terminals for distribution based on the measurement information. In Operation GD, the data information receiving unit 46 receives the data designation information.

In Operation GE, the base station designating unit 51 determines the set S of base stations 4 which transmit the distribution data. If all terminals for distribution, which can be connected to the base stations 4, can receive the distribution data from the macrocell base station 5 as well, the base station designating unit 51 does not select the base station 4 as the transmission base station of the distribution data. The processing of Operations GF to GI is the same as that of Operations AD to AG in FIG. 6.

Figure 23:
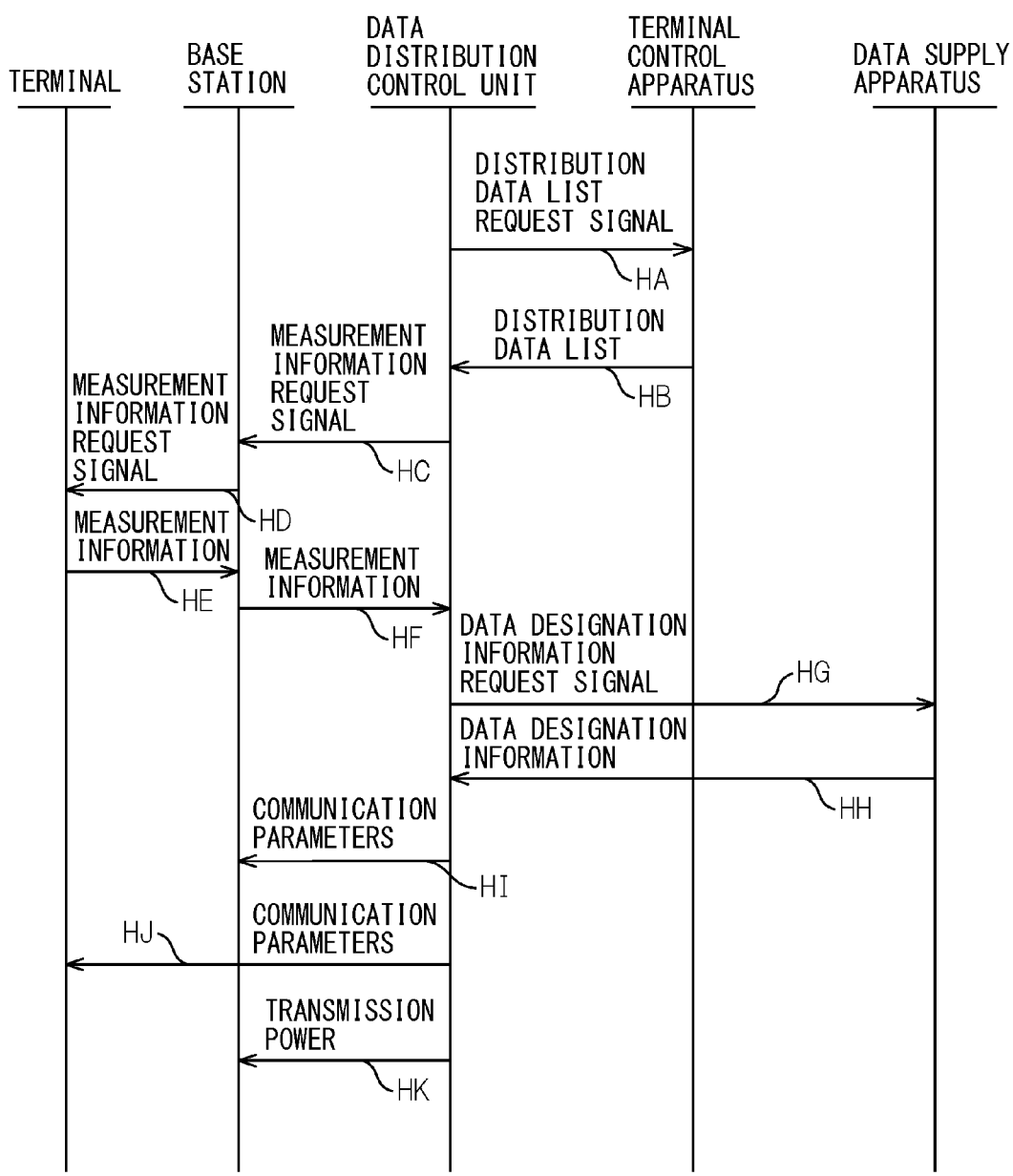
FIG. 23 is a view which depicts a sequence of signals which is transmitted in the processing in FIG. 22.

Next, the sequence of signals will be explained, which signals are transmitted and received at the elements of the data distribution system 1 in the processing of FIG. 22. FIG. 23 is a view which depicts the sequence of signals. Note that, in other embodiments, operations of the following Operations HA to HK may be steps as well.

The processing of Operations HA to HF is the same as that of Operations CA to CF in FIG. 11. The macrocell base station identifying unit 56 identifies the macrocell base stations connectable by the terminals for distribution, based on the measurement information. In Operation HG, the data information receiving unit 46 transmits the data designation information request signal to the data supply apparatus 11. In Operation HH, the data supply apparatus 11 transmits the data designation information to the data information receiving unit 46.

The setting unit 42 of the data distribution control apparatus 20 determines the set S of base stations 4 transmitting the distribution data and then determines the transmission power strengths of the base stations 4 transmitting the distribution data and other communication parameters. At this time, the setting unit 42 does not select the base station 4 as the transmission base station of the distribution data, if all terminals for distribution, which can be connected to the base station 4, can receive the distribution data from the macrocell base station 5 as well. The processing of Operations HI to HK after that is the same as that of Operations CG to CI in FIG. 11.

According to the present embodiment, in a case where the terminals 3 can receive the data from the macrocell base station 5, the distribution data the same as this data is not transmitted from the base station 4. For this reason, by reducing the frequency resource which is used by the base station 4, it becomes possible to improve the efficiency of utilization of the frequency resource. Further, by reducing the data amount to be transmitted to the base station 4, the efficiency of utilization of the communication channels, for transmitting the data to the base station 4, can be improved.

Next, another embodiment of the data distribution control unit 20 will be explained. The modes of distribution for distributing the same distribution data to the multiple terminals 3 includes two modes, i.e., broadcast distribution and multicast distribution. In the case of multicast distribution, the terminals 3 establish the connection with the base station 4, and therefore the base station 4 can set a transmission parameter for each terminal 3. On the other hand, in an environment where a lot of handover occurs, the overhead for control of the handover becomes large. In the present embodiment, by switching the mode of distribution in accordance with the frequency of occurrence of handover, an increase of overhead where a handover happens often is prevented.

Figure 24:
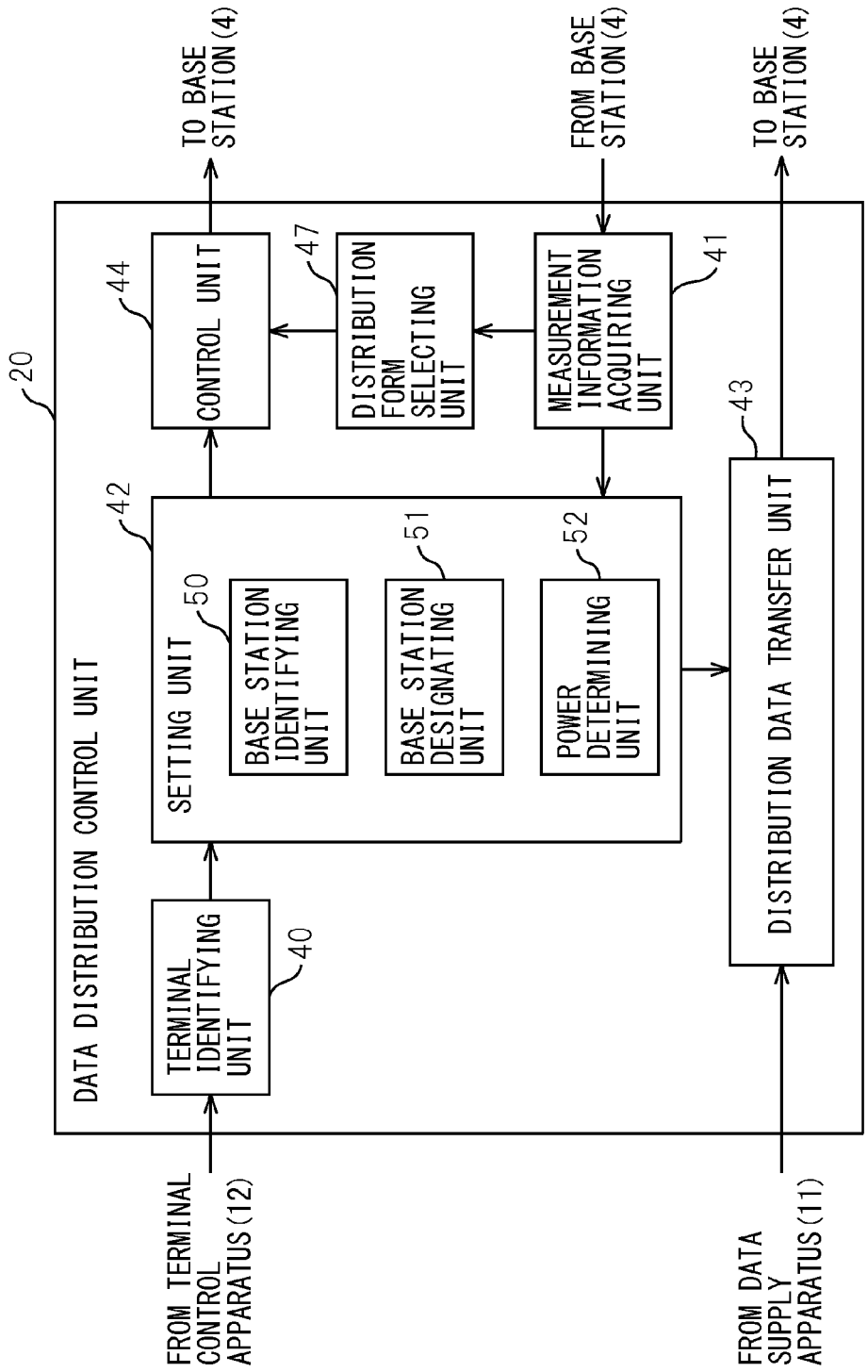
FIG. 24 is a view which represents a fifth example of the configuration of the processing of the data distribution control unit.

FIG. 24 is a view which represents a fifth example of the configuration of the data distribution control unit 20. The same notations will be attached to the same components as the components shown in FIG. 3. Operations of the components given the same notation are the same so long as not particularly explained otherwise. Further, other embodiments may be provided with the components shown in FIG. 24 and their functions as well.

The data distribution control apparatus 20 is provided with a distribution mode selecting unit 47. The distribution mode selecting unit 47 judges whether the distribution data is data for which broadcast distribution is possible. For example, when the distribution data is limited distribution data permitted only for specific users, the distribution mode selecting unit 47 may judge that this distribution data is not data for which broadcast distribution is possible. The distribution mode selecting unit 47 may judge whether the distribution data is the distribution limited data or broadcast distribution data, in accordance with the type and quality of the distribution data.

On the other hand, the measurement information acquiring unit 41 receives, as input from the base station 4 as measurement information, handover information concerning occurrence of handover which occurs in the base station 4. The handover information is information showing a state of occurrence of handover which occurs at the base station 4. The handover information may be, for example, information showing an occurrence of handover in a certain period and its time. For example, it may be information showing the frequency of occurrence of handover or a signal notifying the occurrence of handover whenever a handover occurs.

The distribution mode selecting unit 47 determines the frequency of handover which occurs at the base station 4, based on the handover information. The distribution mode selecting unit 47 selects either the broadcast distribution and the multicast distribution, as the distribution mode of the distribution data, based on the frequency of occurrence of handover. For example, when the frequency of occurrence is larger than a predetermined threshold value, the distribution mode selecting unit 47 selects the broadcast distribution as the distribution mode of the distribution data. Otherwise, it selects the multicast distribution. The control unit 44 sets the distribution mode in the base stations 4 and the terminals 3, which mode is selected by the distribution mode selecting unit 47 as the distribution mode of distribution data.

Next, the processing for selection of the distribution mode of distribution data by the data distribution control unit 20 will be explained. FIG. 25 is an explanatory diagram of the processing for selection of the distribution mode. Note that, in other embodiments, operations of the following Operations IA to ID may be steps as well.

In Operation IA, the distribution mode selecting unit 47 judges whether the distribution data is data capable for broadcast distribution. When the distribution data is the data capable for broadcast distribution (Operation IA: Y), the processing proceeds to Operation IB. When the distribution data cannot be distributed by broadcast (Operation IA: N), the processing proceeds to Operation IC.

In Operation IB, the distribution mode selecting unit 47 determines the frequency of handover which occurs at the base station 4. When the frequency of occurrence is larger than a predetermined threshold value (Operation IB: Y), the processing proceeds to Operation ID. When the frequency of occurrence of handover is not more than the threshold value (Operation IB: N), the processing proceeds to Operation IC. In Operation IC, the distribution mode selecting unit 47 selects the multicast distribution as the distribution mode of the distribution data. In Operation ID, the distribution mode selecting unit 47 selects the broadcast distribution as the distribution mode of distribution data.

According to the present embodiment, when the frequency of occurrence of handover is high, by selecting the broadcast distribution by the data distribution control unit 20, the overhead for control of the handover is reduced. Further, when the frequency of occurrence of handover is low, by selecting the multicast distribution by the data distribution control unit 20, it becomes possible to set the transmission parameters for each terminal.

All examples and conditional terms disclosed here intend an educational object so as to help understanding by readers of the concept given by the present invention and the inventors for development of the technology and must be interpreted without restriction to the above concretely described examples and conditions and the configurations of the examples in the Description showing the superiority and inferiority of the present invention. The embodiments of the present invention were explained in detail, but it must be interpreted that a variety of alterations, substitutions, and amendments can be added to this without deviating from the spirit and scope of the present invention.

REFERENCE SIGNS LIST 1 data distribution system
2 communication network
3, 3a, 3b wireless terminals
4, 4a to 4c base stations
5, 5a to 5c macrocell base stations
13 connecting apparatus
20 data distribution control apparatus
40 terminal identifying unit
41 measurement information acquiring unit
42 setting unit
43 distribution data transfer unit
44 control unit
50 base station identifying unit
51 base station designating unit
52 power determining unit

What is claimed is:

1. A data distribution control apparatus for controlling data distribution in which distribution data having the same content is distributed to one or more wireless terminals, the data distribution control apparatus comprising:
   a terminal identifying unit which identifies multiple wireless terminals to which the distribution data are distributed, and
   a base station designating unit which designates a set of base stations which are selected so that one or more base stations can be connected to all of the multiple wireless terminals, as the set of base stations which transmit the distribution data to the multiple wireless terminals,
   wherein, the base station designating unit includes, in the set of base stations, the base stations which can be connected to the multiple wireless terminals, prior to a base station which can be connected to only one wireless terminal.

2. The data distribution control apparatus according to claim 1, wherein the base station designating unit includes, in the set, the base stations which can be connected to a larger number of wireless terminals with a higher priority order.

3. The data distribution control apparatus according to claim 1, wherein the base station designating unit selects the set so that a number of base stations included in the set becomes the smallest.

4. The data distribution control apparatus according to claim 1, further comprising
a measurement result input unit which inputs measurement results of receiving power measured by the wireless terminals, and
a power determining unit which determines a transmission power of each base station, based on the receiving power from the base station measured by the wireless terminal connectable to the base station and a communication quality required for the distribution data.

5. The data distribution control apparatus according to claim 1, further comprising
a channel quality information acquiring unit which acquires the quality information of a receiving channel used by the base station for reception of the distribution data, and
a base station selecting unit which selects the base stations which receive the distribution data via receiving channels satisfying quality conditions for receiving the distribution data,
wherein, the base station designating unit designates the set of base stations, which transmit the distribution data, from among the base stations selected by the base station selecting unit.

6. The data distribution control apparatus according to claim 5, further comprising a quality change unit which lowers the quality of the distribution data, when the designating unit cannot designate any set of base stations from among the base stations selected by the base station selecting unit.

7. The data distribution control apparatus according to claim 1, wherein the base station is a femtocell base station, and the data distribution control apparatus further comprising
a frequency information input unit which inputs frequency information designating the frequency to be used by macrocell base stations existing around the femtocell base station and
a frequency designating unit which designates, as a transmission frequency of the distribution data used by the femtocell base stations, any frequency other than the frequency designated by the frequency information among the frequencies which are assigned in advance.

8. The data distribution control apparatus according to claim 7, wherein, the frequency designated by the frequency information is the frequency which is used when multiple macrocell base stations distribute the information having the same content with the same frequency.

9. The data distribution control apparatus according to claim 1, wherein, the base station is a femtocell base station, and the data distribution control apparatus further comprising
a data designation information input unit which inputs the data designation information designating the data to be distributed from a macrocell base station, and
a macrocell base station identifying unit which identifies the macrocell base station to which the wireless terminal are connectable,
wherein, the base station designating unit does not designate, as the base station transmitting the distribution data, a femtocell base station which transmits, to the wireless terminals, the distribution data having the same content as that of the data to be distributed from the macrocell base station which can be connected to the wireless terminals.

10. The data distribution control apparatus according to claim 1, further comprising a distribution mode selecting unit which selects either broadcast distribution or multicast distribution, as the distribution mode of the distribution data, based on the frequency of handover occurring at the base station.

11. The data distribution control apparatus according to claim 10, further comprising a data sort judgment unit which judges whether the distribution data is capable being distributed by broadcast, and
the distribution mode selecting unit selects the broadcast distribution in only a case where the distribution data is capable being distributed by broadcast.

12. A data distribution system comprising multiple base stations, a data supply apparatus supplying distribution data to be transmitted from the base stations to wireless terminals, a terminal control apparatus controlling the wireless terminals, and a data distribution control apparatus, the data distribution control apparatus comprises:
a terminal information input unit which inputs, from the terminal control apparatus, the terminal information designating the multiple wireless terminals to which the distribution data are distributed,
a base station designating unit which designates a set of base stations selected so that one or more base stations can be connected to all of the multiple wireless terminals as the set of base stations which transmit the distribution data to the wireless terminals, and
a data transfer unit which transfers the distribution data to the base stations included in the set of base stations,
wherein, the base station designating unit includes, in the set of base stations, a base stations which can be connected to more than one wireless terminals among the multiple wireless terminals, prior to a base station which can be connected to only one wireless terminal among the multiple wireless terminals.

13. A control method of data distribution where distribution data having the same content are distributed to multiple wireless terminals, said control method of data distribution comprising:
identifying the multiple wireless terminals to which the distribution data are distributed,
selecting a set of base stations so that one or more base stations can be connected to all of the multiple wireless terminals,
designating the selected set of base stations as the set of base stations which transmit the distribution data to the wireless terminals,
wherein, when selecting the set of base stations, a base stations which can be connected to more than one wireless terminals among the multiple wireless terminals is prior to a base station which can be connected to only one wireless terminal.

14. A data distribution control apparatus for controlling data distribution in which distribution data having the same content is distributed to one or more wireless terminals, the data distribution control apparatus comprising:
a terminal identifying unit which identifies multiple wireless terminals to which the distribution data are distributed,
a base station designating unit which designates a set of base stations which are selected so that one or more base stations can be connected to all of the multiple wireless terminals, as the set of base stations which transmit the distribution data to the multiple wireless terminals,
wherein, the base station designating unit includes, in the set of base stations, the base stations which can be connected to the multiple wireless terminals, prior to a base station which can be connected to only one wireless terminal,
a data designation information input unit which inputs the data designation information designating the data to be distributed from a macrocell base station, and a macrocell base station identifying unit which identifies the macrocell base station to which the wireless terminal are connectable, wherein, the base station designating unit does not designate, as the base station transmitting the distribution data, a femtocell base station which transmits, to the wireless terminals, the distribution data having the same content as that of the data to be distributed from the macrocell base station which can be connected to the wireless terminals.

15. A data distribution control apparatus for controlling data distribution in which distribution data having the same content is distributed to one or more wireless terminals, the data distribution control apparatus comprising:

a terminal identifying unit which identifies multiple wireless terminals to which the distribution data are distributed, a base station designating unit which designates a set of base stations which are selected so that one or more base stations can be connected to all of the multiple wireless terminals, as the set of base stations which transmit the distribution data to the multiple wireless terminals, wherein, the base station designating unit includes, in the set of base stations, the base stations which can be connected to the multiple wireless terminals, prior to a base station which can be connected to only one wireless terminal, and a distribution mode selecting unit which selects either broadcast distribution or multicast distribution, as the distribution mode of the distribution data, based on the frequency of handover occurring at the base station.

16. The data distribution control apparatus according to claim 15, further comprising a data sort judgment unit which judges whether the distribution data is capable being distributed by broadcast, and the distribution mode selecting unit selects the broadcast distribution in only a case where the distribution data is capable being distributed by broadcast.

* * * * *